US012769569B2

(12) United States Patent
Kim et al.

(10) Patent No.: US 12,769,569 B2
(45) Date of Patent: Oct. 20, 2026

(54) VIRTUALIZATION DEVICE INCLUDING STORAGE DEVICE AND COMPUTATIONAL DEVICE, AND METHOD OF OPERATING THE SAME

(71) Applicant: MANGOBOOST, INC.

(72) Inventors: Jangwoo Kim, Seoul (KR); Dongup Kwon, Seoul (KR)

(73) Assignee: MANGOBOOST, INC., Bellevue, WA (US)

( * ) Notice: Subject to any disclaimer, the term of this patent is extended or adjusted under 35 U.S.C. 154(b) by 966 days.

(21) Appl. No.: 17/863,614

(22) Filed: Jul. 13, 2022

(65) Prior Publication Data

US 2023/0016692 A1 Jan. 19, 2023

(30) Foreign Application Priority Data

Jul. 14, 2021 (KR) ........................ 10-2021-0092432
Jul. 5, 2022 (KR) ........................ 10-2022-0082341

(51) Int. Cl.
*G06F 9/455* (2018.01)

(52) U.S. Cl.
CPC .. *G06F 9/45558* (2013.01); *G06F 2009/4557* (2013.01); *G06F 2009/45579* (2013.01); *G06F 2009/45583* (2013.01)

(58) Field of Classification Search
CPC ......... G06F 9/45558; G06F 2009/4557; G06F 2009/45583; G06F 2009/45579; G06F 3/0664

(Continued)

(56) References Cited

U.S. PATENT DOCUMENTS

2015/0143134 A1 5/2015 Hashimoto
2016/0246635 A1* 8/2016 Kaplan ................ G06F 9/5077

(Continued)

FOREIGN PATENT DOCUMENTS

KR 10-2016-0096279 A 8/2016
KR 10-2020-0129863 A 11/2020

OTHER PUBLICATIONS

Dongup Kwon et al., "FVM: FPGA-assisted Virtual Device Emulation for Fast, Scalable, and Flexible Storage Virtualization", 14th USENIX Symposium on Operating Systems Design and Implementation, Nov. 4-6, 2020.

*Primary Examiner* — Pierre Vital
*Assistant Examiner* — Daniel Trainor
(74) *Attorney, Agent, or Firm* — NKL LAW; Jae Youn Kim

(57) ABSTRACT

Disclosed is a virtualization device communicating with a host device executing a virtual machine and including a computational storage virtualization (CSV) device, a storage device, and a computational device. A method of operating the virtualization device includes receiving a first request indicating a first address of the virtual machine, a second address of the storage device, and a read operation, acquiring a third address of a real machine and a fourth address of the computational device based on the first request, providing the storage device with a second request indicating the second address, the fourth address, and a redirection, providing the computational device with raw data based on the second request, providing the computational device with a third request indicating the third address, the fourth address, and a processing operation, generating processed data, and providing the host device with the processed data.

16 Claims, 14 Drawing Sheets

(58) Field of Classification Search
USPC .............................................................. 718/1
See application file for complete search history.

(56) References Cited

U.S. PATENT DOCUMENTS

| | | | | |
|---|---|---|---|---|
| 2019/0272240 | A1 | 9/2019 | Kachare et al. | |
| 2020/0218678 | A1 | 7/2020 | Prabhakar et al. | |
| 2022/0066799 | A1* | 3/2022 | Pinto | G06F 9/3877 |
| 2022/0236902 | A1* | 7/2022 | Pinto | G06F 3/067 |
| 2022/0253227 | A1* | 8/2022 | Helmick | G06F 3/0631 |
| 2022/0391148 | A1* | 12/2022 | Venkataraman | G06F 3/0604 |

* cited by examiner

VIRTUALIZATION DEVICE INCLUDING STORAGE DEVICE AND COMPUTATIONAL DEVICE, AND METHOD OF OPERATING THE SAME

CROSS-REFERENCE TO RELATED APPLICATIONS

This application claims priority under 35 U.S.C. § 119 to Korean Patent Application Nos. 10-2021-0092432 filed on Jul. 14, 2021 and 10-2022-0082341 filed on Jul. 5, 2022, in the Korean Intellectual Property Office, the disclosures of which are incorporated by reference herein in their entireties.

BACKGROUND

Embodiments of the present disclosure described herein relate to a virtualization device, and more particularly, relate to a virtualization device including a storage device and a computational device, and a method of operating the same.

A storage virtualization technology provides a virtual machine with resources of an actual storage device. The virtual machine may be a computing environment implemented by software, and an operating system or an application may be installed and executed on the virtual machine. The virtual machine may read data stored in an actual storage device depending on a read request or may store data in the actual storage device depending on a write request.

For efficient management and security improvement of large-capacity data, the storage device may store data compressed or encrypted by a processor of a host device or a separate computational device instead of storing data received from the virtual machine as it is. When a computational technology for the virtual machine is implemented in software, the resource burden of the host device may increase and data processing speed may decrease. While the resource burden of the host device is reduced and high-speed data communication between devices is guaranteed, a method of providing a virtual machine with computational resources and storage resources may be required.

SUMMARY

Embodiments of the present disclosure provide a virtualization device including a storage device and a computational device, and a method of operating the same are provided.

According to an embodiment, a virtualization device communicates with a host device executing a virtual machine and includes a computational storage virtualization (CSV) device, a storage device, and a computational device. A method of operating the virtualization device includes receiving, by the CSV device, a first request indicating a first address of the virtual machine, a second address of the storage device, and a read operation from the host device, acquiring, by the CSV device, a third address of a real machine corresponding to the virtual machine and a fourth address of the computational device based on the first request, providing, by the CSV device, the storage device with a second request indicating the second address, the fourth address, and a redirection, providing, by the storage device, the computational device with raw data based on the second request, providing, by the CSV device, the computational device with a third request indicating the third address, the fourth address, and a processing operation, generating, by the computational device, processed data based on the third request and the raw data, and providing, by the computational device, the host device with the processed data.

According to an embodiment, a virtualization device communicates with a host device executing a virtual machine and includes a CSV device, a storage device, and a computational device. A method of operating the virtualization device includes receiving, by the CSV device, a first request indicating a first address of the virtual machine, a second address of the storage device, and a write operation from the host device, acquiring, by the CSV device, a third address of a real machine corresponding to the virtual machine and a fourth address of the computational device based on the first request, providing, by the CSV device, the computational device with a second request indicating the third address, the fourth address, and a processing operation, receiving, by the computational device, raw data based on the second request from the host device, generating, by the computational device, processed data based on the second request and the raw data, providing, by the CSV device, the storage device with a third request indicating the second address, the fourth address, and a store operation, receiving, by the storage device, the processed data based on the third request from the computational device, and storing, by the storage device, the processed data.

According to an embodiment, a virtualization device includes a storage device that stores first data, a computational device that processes the first data and to process second data of a virtual machine executed by a host device, a CSV device, and a PCIe circuit connected to the storage device, the computational device, the CSV device, and the host device. The CSV device receives a first request including a first address of the virtual machine and a second address of the storage device from the host device, acquires a third address of a real machine corresponding to the virtual machine and a fourth address of the computational device, determines whether the first request indicates a read operation or a write operation, provides the storage device with a second request indicating the second address, the fourth address, and a redirection and provide the computational device with a third request indicating the third address, the fourth address, and a first processing operation of the first data when it is determined that the first request indicates the read operation, and provides the computational device with a fourth request indicating the third address, the fourth address, and a second processing operation of the second data and provide the storage device with a fifth request indicating the second address, the fourth address, and a store operation when it is determined that the first request indicates the write operation.

BRIEF DESCRIPTION OF THE FIGURES

The above and other objects and features of the present disclosure will become apparent by describing in detail embodiments thereof with reference to the accompanying drawings.

DETAILED DESCRIPTION

Below, embodiments of the present disclosure will be described in detail and clearly to such an extent that one skilled in the art easily carries out the present disclosure.

Components described in the detailed description with reference to terms "part", "unit", "module", "layer", etc. and function blocks illustrated in drawings may be implemented in the form of software, hardware, or a combination thereof. For example, the software may be a machine code, firmware, an embedded code, and application software. For example, the hardware may include an electrical circuit, an electronic circuit, a processor, a computer, an integrated circuit, integrated circuit cores, a pressure sensor, an inertial sensor, a microelectromechanical system (MEMS), a passive element, or a combination thereof.

Figure 1:
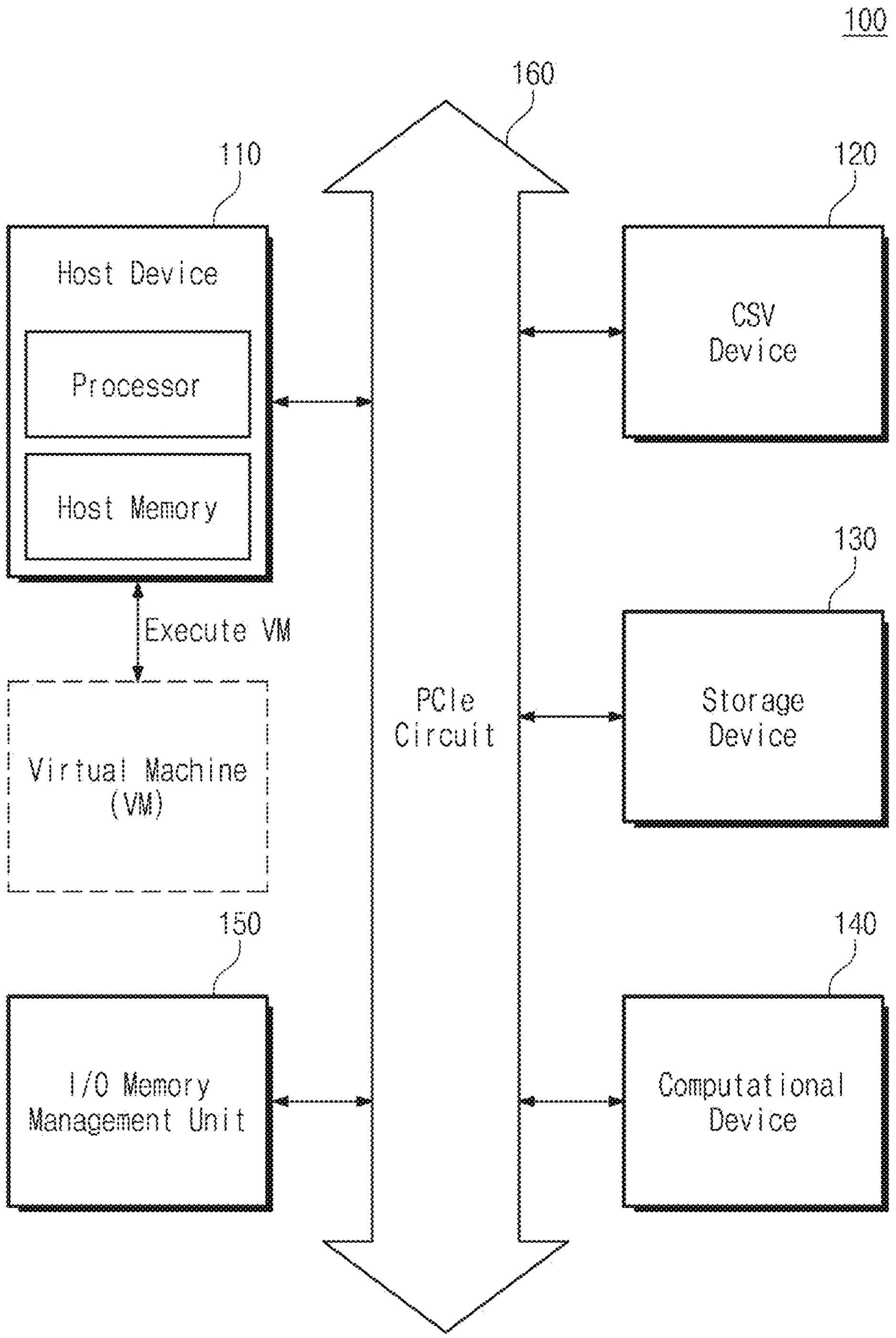
FIG. 1 is a block diagram of a storage system, according to an embodiment of the present disclosure.

FIG. 1 is a block diagram of a storage system, according to an embodiment of the present disclosure. Referring to FIG. 1, a storage system 100 may include a host device 110, a computational storage virtualization (CSV) device 120, a storage device 130, a computational device 140, an input/output (I/O) memory management unit 150, and a peripheral component interconnect express (PCIe) circuit 160.

The storage system 100 may provide a virtual machine VM. A virtual machine VM may be a computing environment implemented by software, and an operating system or an application may be installed and executed on the virtual machine VM. In some embodiments, the storage system 100 may be a server device. For example, the storage system 100 may be a server device that provides a cloud computing environment including the virtual machine VM for a user.

The host device 110 may include a processor and a host memory. A processor of the host device 110 may execute the virtual machine VM by executing commands stored in the host memory. For example, the processor of the host device 110 may actually perform computations for an operating system (OS) and an application executed on the virtual machine VM.

The processor of the host device 110 may manage requests (e.g., a read request and a write request) for data processing of the virtual machine VM. The host memory may manage data, which is to be provided to the storage device 130 depending on a write request of the virtual machine VM, and data, which is to be received depending on a read request from the storage device 130.

The CSV device 120 may provide a virtualization environment according to the virtual machine VM to the storage device 130 and the computational device 140. The CSV device 120 may provide storage resources and computational resources to the virtual machine VM without the burden of resource management of the host device 110.

For example, the CSV device 120 may communicate with the host device 110 that executes the virtual machine VM. The CSV device 120 may communicate with the storage device 130 and the computational device 140. The CSV device 120 may change a request of the virtual machine VM into requests capable of being performed by the storage device 130 and the computational device 140. The storage device 130 and the computational device 140 may process a request of the virtual machine VM depending on the assistance of the CSV device 120 without the burden of resource management of the host device 110.

In some embodiments, the CSV device 120 may guarantee direct communication between different devices. For example, the CSV device 120 may assist the host device 110 and the storage device 130 so as to directly communicate data through the PCIe circuit 160, may assist the host device 110 and the computational device 140 so as to directly communicate data, and may assist the storage device 130 and the computational device 140 so as to directly communicate data. Direct data communication may also be referred to as direct memory access (DMA) communication.

In some embodiments, the CSV device 120 may be implemented with a hardware accelerator. For example, the CSV device 120 may be implemented with a field programmable gate array (FPGA). The FPGA may be hardware that manages storage resources and computational resources for the virtual machine VM.

In some embodiments, the CSV device 120 may flexibly manage storage resources and computational resources. For example, to process requests from the plurality of virtual machine VMs, the CSV device 120 may allocate resources to a plurality of storage devices and a plurality of computational devices without the burden of resource management of the host device 110. This will be described in more detail with reference to FIG. 10.

The storage device 130 may store data. For example, the storage device 130 may provide data depending on a read request of the virtual machine VM, or may store data depending on a write request of the virtual machine VM. The storage device 130 may store data processed by the computational device 140.

The computational device 140 may process data provided from the storage device 130 or the host device 110. For example, when a read request is issued from the virtual machine VM, under the management of the CSV device 120, the storage device 130 may provide stored raw data to the computational device 140; the computational device 140 may process the raw data; and, the computational device 140 may provide the processed data to the host device 110.

As another example, when a write request is issued from the virtual machine VM, under the management of the CSV device, the computational device 140 may receive raw data from the host device 110; the computational device 140 may process raw data; and, the storage device 130 may store data processed by the computational device 140.

In some embodiments, the computational device 140 may compress or encrypt data. For example, when a read request is issued from the virtual machine VM, the computational device 140 may receive raw data corresponding to the read request from the storage device 130, may decompress or decrypt the raw data, and may provide the decompressed or decrypted data to the host device 110.

As another example, when a write request is issued from the virtual machine VM, the computational device 140 may receive raw data corresponding to the write request from the host device 110, may compress or encrypt the raw data, and may provide compressed or encrypted data to the storage device 130.

In some embodiments, the computational device 140 may be implemented with a hardware accelerator. For example, the computational device 140 may be implemented with an FPGA. The FPGA may be hardware that provides computational resources.

The I/O memory management unit 150 may manage a mapping relationship between a virtual address of the virtual machine VM and a real address of a real machine (i.e., the host device 110) corresponding to the virtual machine VM. For example, the virtual machine VM may be implemented with software executed by the processor of the host device 110, and a virtual address for data managed by the virtual machine VM may correspond to a real address for data stored in the host memory of the host device 110. The I/O memory management unit 150 may translate a virtual address into a corresponding physical address or may translate a physical address into a corresponding virtual address.

In some embodiments, when the CSV device 120 includes an address translation table for managing the mapping relationship between virtual addresses and real addresses, the I/O memory management unit 150 may be omitted. Alternatively, the I/O memory management unit 150 and the address management table in the CSV device 120 may be used together to manage virtual addresses and real addresses.

The PCIe circuit 160 may be connected to the host device 110, the CSV device 120, the storage device 130, the computational device 140, and the I/O memory management unit 150. The PCIe circuit 160 may provide a direct interface environment to an arbitrary combination of the CSV device 120, the storage device 130, the computational device 140, and the I/O memory management unit 150. For example, the storage device 130 may directly communicate data with the computational device 140 through the PCIe circuit 160.

As described above, according to an embodiment of the present disclosure, the CSV device 120 provides a virtualization environment to the storage device 130 and the computational device 140. The CSV device 120 is implemented as separate hardware, not a software module, thereby reducing the resource management burden of the host device 110. The CSV device 120 may guarantee direct communication to an arbitrary combination of the host device 110, the storage device 130, and the computational device 140 by converting a request from the virtual machine VM.

Figure 2:
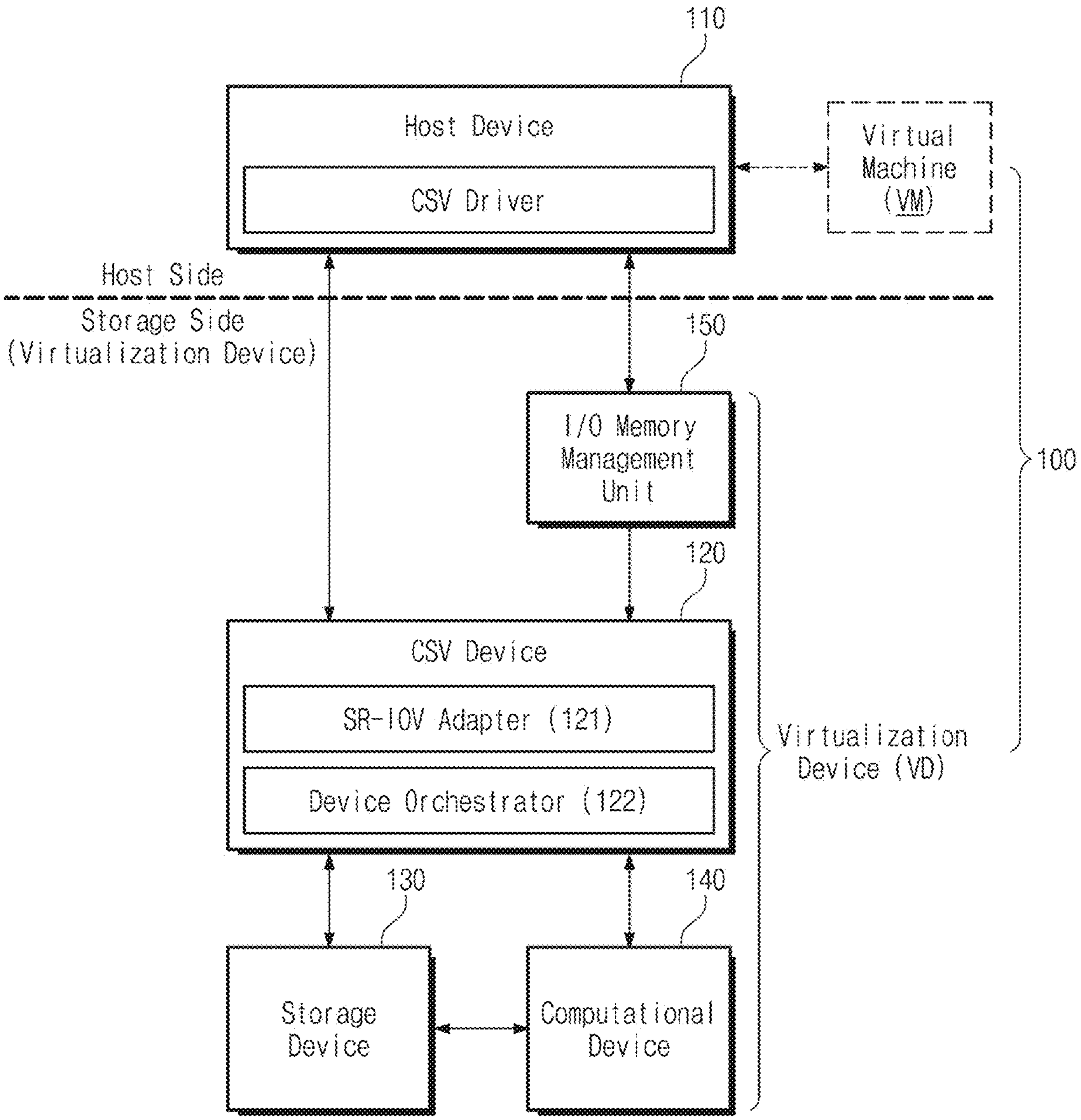
FIG. 2 is a block diagram illustrating the storage system of FIG. 1, according to some embodiments of the present disclosure.

FIG. 2 is a block diagram illustrating the storage system of FIG. 1, according to some embodiments of the present disclosure. Referring to FIGS. 1 and 2, the storage system 100 may be divided into a host side and a storage side. The storage side may also be referred to as a virtualization device VD.

The host side may include the host device 110 and the virtual machine VM executed by the host device 110. The host device may include a CSV driver. The CSV driver may be software that stores information necessary to communicate with the CSV device 120. The host device 110 may communicate with the CSV device 120 by executing the CSV driver.

The storage side may include the CSV device 120, the storage device 130, the computational device 140, and the I/O memory management unit 150.

The CSV device 120 may communicate with the host device 110 directly or may communicate with the host device 110 through the I/O memory management unit 150. The CSV device 120 may include a single root input/output virtualization (SR-IOV) adapter 121 and a device orchestrator 122.

The SR-IOV adapter 121 may provide an interface with the virtual machine VM. The SR-IOV adapter 121 may allow the virtual machine VM to access the storage device 130 or the computational device 140 without passing through a software layer.

The device orchestrator 122 may identify the virtual machine VM through the SR-IOV adapter 121. The device orchestrator 122 may identify the storage device 130 and the computational device 140. The device orchestrator 122 may allocate storage resources of the storage device 130 for the virtual machine VM and computational resources of the computational device 140 for the virtual machine VM.

On the basis of a read request provided by the virtual machine VM, the device orchestrator 122 may generate a redirection request to be provided to the storage device 130 and a processing request to be provided to the computational device 140. For example, the redirection request may be implemented by changing a destination address of the read request provided from the virtual machine VM to an address of the computing device 140, instead of an address of the storage device 130. On the basis of the write request provided by the virtual machine VM, the device orchestrator 122 may generate a processing request to be provided to the computational device 140, and a store request to be provided to the storage device 130.

The storage device 130 may communicate with the CSV device 120 and the computational device 140. At the request of the CSV device 120, the storage device 130 may directly provide data to the computational device 140 through the PCIe circuit 160 or may directly receive processed data from the computational device 140 through the PCIe circuit 160.

The computational device 140 may communicate with the CSV device 120 and the storage device 130. At the request of the CSV device 120, the computational device 140 may directly provide the processed data to the storage device 130 through the PCIe circuit 160 or may receive data directly from the storage device 130 through the PCIe circuit 160.

Figure 3:
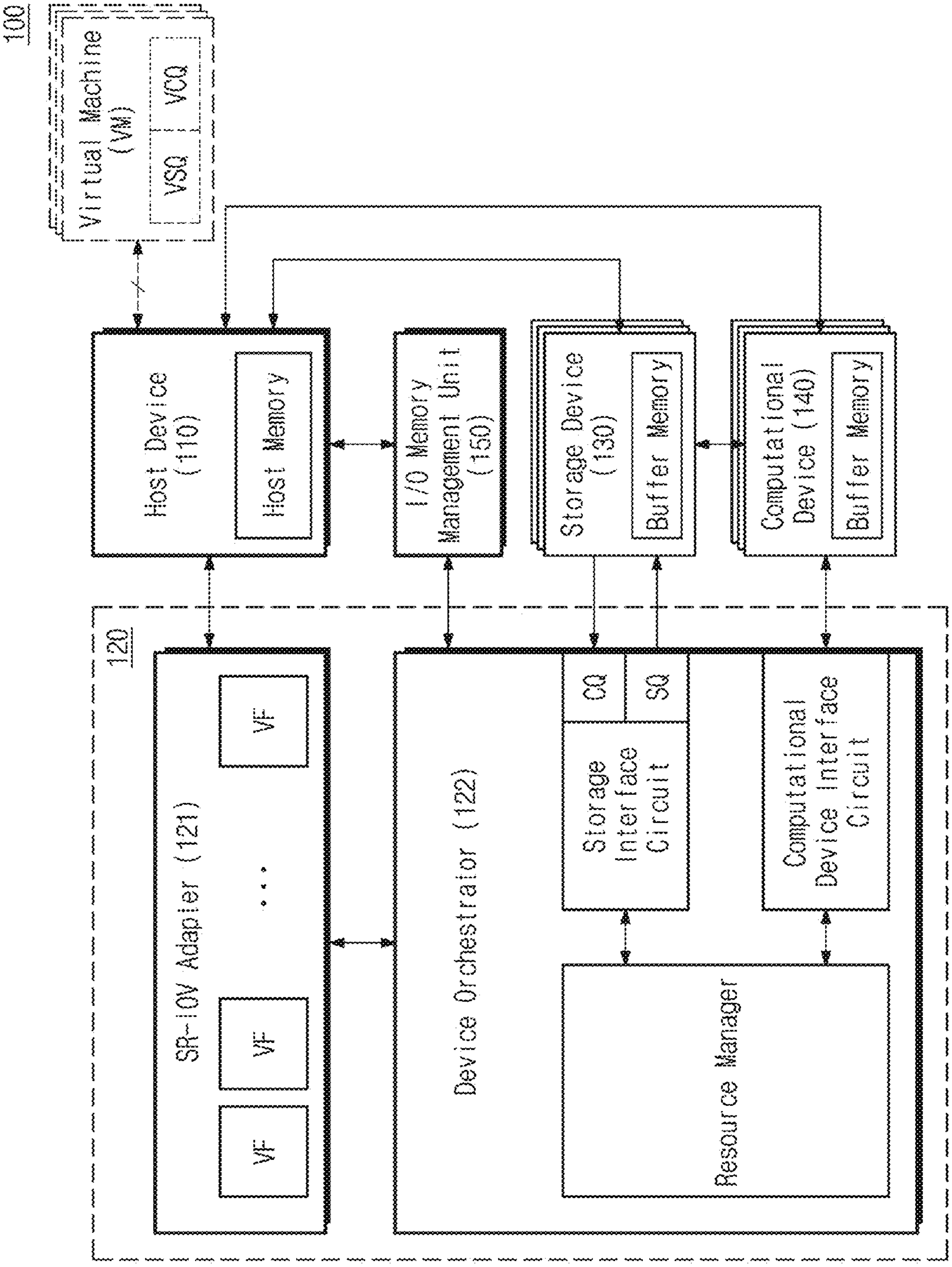
FIG. 3 is a block diagram for describing the storage system of FIG. 1, according to some embodiments of the present disclosure.

FIG. 3 is a block diagram for describing the storage system of FIG. 1, according to some embodiments of the present disclosure. Referring to FIGS. 1 and 3, the storage system 100 may include the host device 110, the CSV device 120, the storage device 130, the computational device 140, the I/O memory management unit 150, and the PCIe circuit 160.

The storage system 100 may identify the virtual machine VM, which is a target virtual machine, from among a plurality of virtual machines. The storage system 100 may identify the storage device 130, which is a target storage device, from among a plurality of storage devices. The storage system 100 may identify the computational device 140, which is a target computational device, from among a plurality of computational devices.

To process requests from the plurality of virtual machines, the storage system 100 may flexibly allocate storage resources of the plurality of storage devices, and may flexibly allocate computational resources of the plurality of computational devices. When the number of virtual machines, the number of storage devices, or the number of computational devices increases or decreases, the storage system 100 may reallocate storage resources and computational resources to the changed virtual environment.

The host device 110 may execute the virtual machine VM. The virtual machine VM may include a virtual submission queue (VSQ) and a virtual completion queue (VCQ). The VSQ may be a memory into which a command requested by the virtual machine VM is to be written. The VCQ may be a memory that receives a completion indicating that a command written to the corresponding VSQ is completely processed. The VSQ may correspond to the VCQ. Virtual addresses of the VSQ and the VCQ may correspond to a part of a host memory of the host device 110.

The host device 110 may include the host memory. The storage device 130 may include a buffer memory. The computational device 140 may include a buffer memory. An arbitrary combination of the host memory of the host device 110, the buffer memory of the storage device 130, and the buffer memory of the computational device 140 may directly communicate data through the PCIe circuit 160.

The I/O memory management unit 150 may communicate with the host device 110 and the CSV device 120. The I/O memory management unit 150 may translate a virtual address provided from the host device 110 into a real address, and may provide the real address to the CSV device 120. The I/O memory management unit 150 may translate the real address provided from the CSV device 120 into a virtual address, and may provide the virtual address to the host device 110. In some embodiments, when the CSV device 120 includes an address translation table for managing the mapping relationship between virtual addresses and real addresses, the I/O memory management unit 150 may be omitted.

The CSV device 120 may include the SR-IOV adapter 121 and the device orchestrator 122.

The SR-IOV adapter 121 may communicate with the host device 110 and the device orchestrator 122. The SR-IOV adapter 121 may include a plurality of virtual functions (hereinafter referred to as "VFs"). The plurality of VFs may correspond to the plurality of virtual machine VMs, respectively. Each of the plurality of VFs may provide an interface with the corresponding virtual machine VM. The VF may allow the corresponding virtual machine VM to access the storage device 130 and the computational device 140 through the device orchestrator 122 without passing through a software layer. Each of the plurality of VFs in the SR-IOV adapter 121 may operate as an independent device. The VF may support the allocation of storage resources and computational resources to the corresponding virtual machine VM.

The device orchestrator 122 may communicate with the SR-IOV adapter 121, the storage device 130, the computational device 140, and the I/O memory management unit 150. The device orchestrator 122 may include a storage interface circuit, a computational device interface circuit, and a resource manager The storage interface circuit may provide an interface between the resource manager and the storage device 130. The storage interface circuit may include a submission queue (SQ) and a completion queue (CQ). The SQ may correspond to a command written to the VSQ and may be a memory, into which a command to be provided to the storage device 130 is written. The CQ may be a memory that receives a completion indicating that a command written to the corresponding SQ is completely processed. The SQ may correspond to the CQ.

The computational device interface circuit may provide an interface between the resource manager and the computational device 140.

The resource manager may receive a request from the virtual machine VM through the SR-IOV adapter 121. The resource manager may communicate with the storage device 130 through a storage interface. The resource manager may communicate with the computational device 140 through the computational device interface circuit.

The resource manager may change some fields of a request from the virtual machine VM and may provide the changed field to the storage device 130 or the computational device 140. A more detailed description of the changed field will be described later with reference to FIGS. 4 and 5.

The resource manager may manage the plurality of virtual machine VMs, the plurality of storage devices, and the plurality of computational devices. For example, the resource manager may identify a target storage device among the plurality of storage devices with reference to indices of the plurality of storage devices. The resource manager may identify a target computational device among the plurality of computational devices with reference to indices of the plurality of computational devices. The resource manager may allocate storage resources of the identified storage device and computational resources of the identified computational device to the virtual machine VM.

The resource manager may manage the mapping between the virtual machine VM and the storage device 130. For example, the VSQ and VCQ of the virtual machine VM may correspond to the SQ and CQ of the storage interface circuit, respectively. A layer of a command to be written to the VSQ may be different from a layer of a command to be written to the SQ. A layer of a completion to be written to the CQ may be different from a layer of a completion to be written to the VCQ. The resource manager may fetch the command written to the VSQ, may change the layer of the fetched command, and may write the layer-changed command to the SQ. The resource manager may fetch the completion written to the CQ, may change the layer of the fetched completion, and may write the layer-changed completion to the VCQ.

In some embodiments, the resource manager may follow a non-volatile memory express (NVMe) standard. For example, the resource manager may receive, from the host device 110, a doorbell indicating that a command is written to the VSQ. The resource manager may fetch the command written to the VSQ. The resource manager may write the layer-changed command to the SQ based on the fetched command The resource manager may provide a doorbell to the storage device 130. The storage device 130 may fetch a command of which a layer of the SQ is changed. The storage device 130 may process the command by communicating with the computational device 140.

After processing the command, the storage device 130 may write a completion to the CQ. The storage device 130 may provide an interrupt to the resource manager. The resource manager may fetch the completion written to the CQ and may write the layer-changed completion to the VCQ based on the fetched completion. The resource manager may provide a doorbell to the storage device 130. The resource manager may provide an interrupt to the host device 110. The host device 110 may process the completion written in the VCQ. The host device 110 may provide a doorbell to the resource manager.

In some embodiments, the resource manager may include an address translation table. The address translation table may manage the mapping relationship between virtual addresses and real addresses. With reference to the address translation table, the resource manager may translate a virtual address into a real address, or may translate a real address into a virtual address. In this case, the I/O memory management unit 150 may be omitted, or the address translation table and the I/O memory management unit 150 may be used together.

In some embodiments, the resource manager may include an inner-computational device. The inner-computational device may process data received from the storage device 130 or may process data received from the host device 110. The inner-computational device may perform a function similar to a function of the computational device 140. In this case, the computational device 140 may be omitted, or the inner-computational device and the computational device 140 may be used together. A more detailed description of the inner-computational device will be described later with reference to FIGS. 11 and 12.

Figure 4:
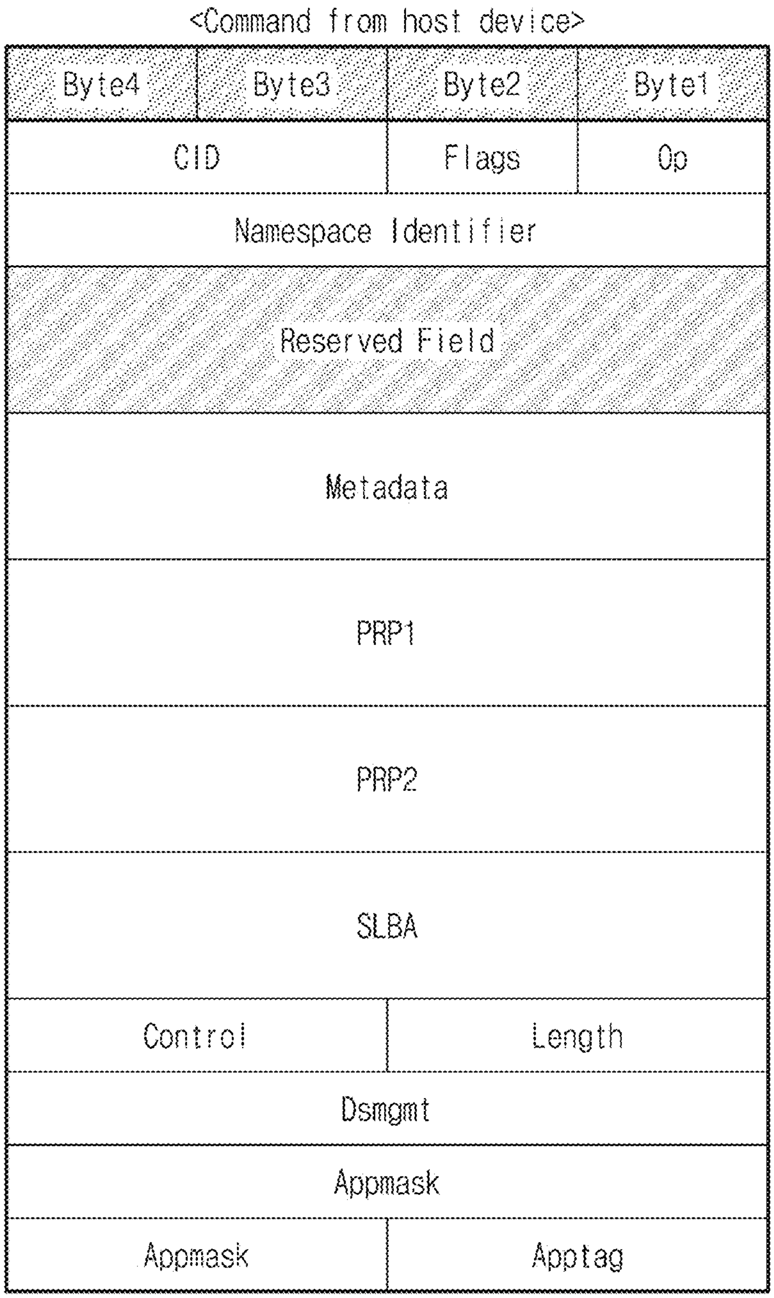
FIG. 4 is a diagram illustrating a command format, according to some embodiments of the present disclosure.

FIG. 4 is a diagram illustrating a command format, according to some embodiments of the present disclosure. Referring to FIGS. 1 and 4, a command format of a command received from the host device 110 will be described.

In some embodiments, the command format may follow an NVMe standard. For example, the command format may include 'Op', 'Flags', 'CID', 'Namespace Identifier', 'Reserved Field', 'Metadata', 'PRP1', 'PRP2', 'SLBA', 'Length', 'Control', 'Dsmgmt', 'Appmask', and 'Apptag'.

'Op' may indicate an opcode or an operation code. For example, 'Op' may indicate whether an operation to be processed by a command is a read operation or a write operation.

'Flags' may manage flag values for a persistent memory region.

'CID' may indicate a command identifier. The command identifier may be used to distinguish a command from another command Namespace Identifier' may be used to distinguish a namespace from another namespace. The namespace may be a space for allocating a name to a file in a file system.

'Reserved Field' may indicate regions capable of being changed depending on designs.

'Metadata' may be used to describe data to be processed depending on a command or may indicate information related to the data.

'PRP1' may indicate a first physical region page. 'PRP2' may indicate a second physical region page. The first and second physical region pages may indicate addresses in a memory used for DMA communication.

'SLBA' may indicate a start logical block address. When several virtual machines share one storage device, different offset values may be respectively provided to several virtual machines through 'SLBA' such that addresses used by several virtual machines do not overlap with one another. Each of several virtual machines may refer to an address acquired by adding an offset value.

'Length' may indicate the length of bytes in a data block. 'Control' may be used to control data transmission. 'Dsmgmt', 'Appmask', and 'Apptag' may be fields managed by an operating system or file system of the virtual machine VM or the host device 110.

According to some embodiments of the present disclosure, the CSV device 120 may generate a request capable of being processed by the storage device 130 or the computational device 140 by changing the reserved field of a command. The reserved field may include a CSV command proposed according to an embodiment of the present disclosure. A more detailed description of the reserved field will be described later with reference to FIG. 5.

Figure 5:
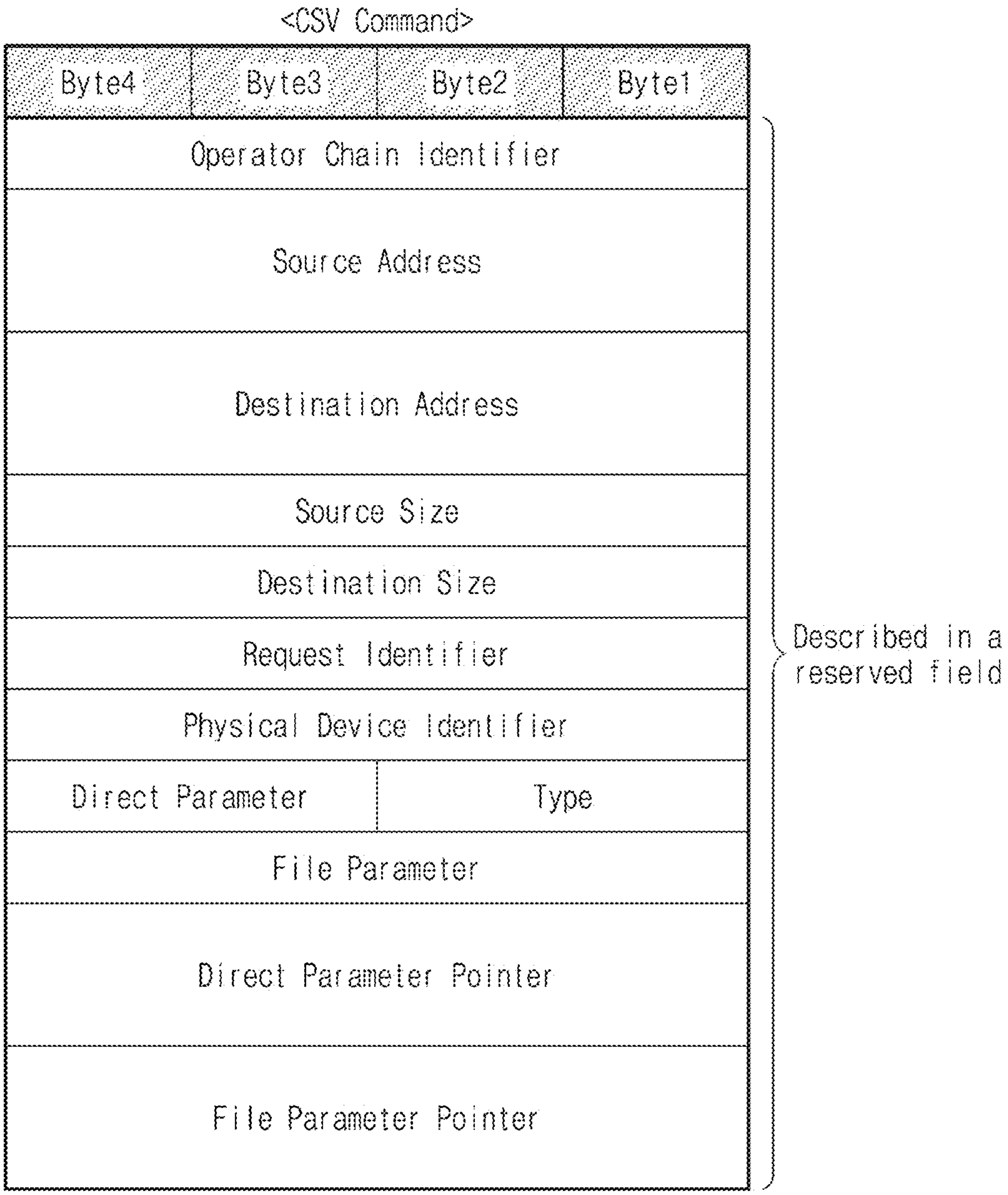
FIG. 5 is a diagram for describing the reserved field of FIG. 4, according to some embodiments of the present disclosure.

FIG. 5 is a diagram for describing the reserved field of FIG. 4, according to some embodiments of the present disclosure. Referring to FIGS. 1, 4, and 5, a reserved field of a command received from the host device 110 may indicate a location where a CSV command is stored. For example, the reserved field of the command received from the host device 110 may indicate a location where fields corresponding to the CSV command are stored in the host device.

The CSV command may include at least one of an operator chain identifier, a source address, a destination address, a source size, a destination size, a request identifier, a physical device identifier, a type, a direct parameter, a file parameter, a direct parameter pointer, and a file parameter pointer.

The operator chain identifier may indicate the kind of operation to be processed by the computational device 140. For example, the operator chain identifier may be an operation to be processed by the computational device 140, and may indicate an encryption operation, a compression operation, or an encryption and compression operation. Alternatively, the operator chain identifier may be an operation to be processed by the computational device 140, and may indicate a decryption operation, a decompression operation, or a decryption and decompression operation.

The source address may point to a location of a source that requests the processed data. The destination address may point to a location of a destination that receives the processed data.

For example, when a read request is issued from the virtual machine VM, after redirecting raw data of the storage device 130 to the computing device 140, the source address may point to a buffer memory in the computing device 140. In order to provide the data processed by the computing device 140 to the virtual machine VM, the destination address may point to a host memory of the host device 110 executing the virtual machine VM.

As another example, when a write request is issued from the virtual machine VM, in order for the arithmetic unit 140 to receive raw data from the host device 110 before the arithmetic unit 140 generates the processed data, the source address may point to a host memory of the host device 110 running the virtual machine VM. In order to process the raw data by the computing device 140 before storing the processed data in the storage device 130, the destination address may point to a buffer memory of the computing device 140.

In some embodiments, the location of the buffer memory of the storage device 130 may be managed by the SLBA of the command of FIG. 4. For example, when a read request or a write request is issued from the virtual machine VM, the SLBA of the command of the host device 110 of FIG. 4 may point to the buffer memory of the storage device 130.

The source size may indicate the size of data to be transmitted depending on the source address.

The destination size may indicate the size of data to be transmitted depending on the destination address.

The request identifier may indicate an operation indicated by a request. For example, the request identifier may be an operation indicated by a request, and may indicate one of operations such as a read operation, a write operation, a processing operation, a redirection operation, and a storage operation. The request identifier may manage dependency between different requests. For example, when a request identifier of a current request is the same as a request identifier of a previous request, the storage system 100 may suspend the execution of the current request until the previous request is completely processed.

The physical device identifier may indicate an index of the storage device 130 and an index of the computational device 140. For example, the storage system 100 may include a plurality of storage devices and a plurality of computational devices. With reference to indexes described in the physical device identifier, the storage system 100 may identify the storage device 130, which is a target storage device, from among the plurality of storage devices, and may identify the computational device 140, which is a target computational device, from among the plurality of computational devices.

The type may indicate whether access to the storage device 130 is required.

The direct parameter may indicate a location in a host memory of the host device 110 where information used to process an operation of the computational device is stored. For example, the direct parameter may indicate a location of the host memory where parameters such as a function, an algorithm, a hash function, a key-value, and the like used to process an operation such as compression, decompression, encryption, and decryption are stored.

The file parameter may indicate a location in the storage device 130 where copied information used to process an operation of the computational device is stored. For example, the file parameter may indicate a location of the storage device 130 where parameters such as a function, an algorithm, a hash function, a key-value, and the like used to process an operation such as compression, decompression, encryption, and decryption are copied.

The direct parameter pointer may be a field in which a pointer used to transmit the direct parameter is stored.

The file parameter pointer may be a field in which a pointer used to transmit the file parameter is stored.

Figure 6:
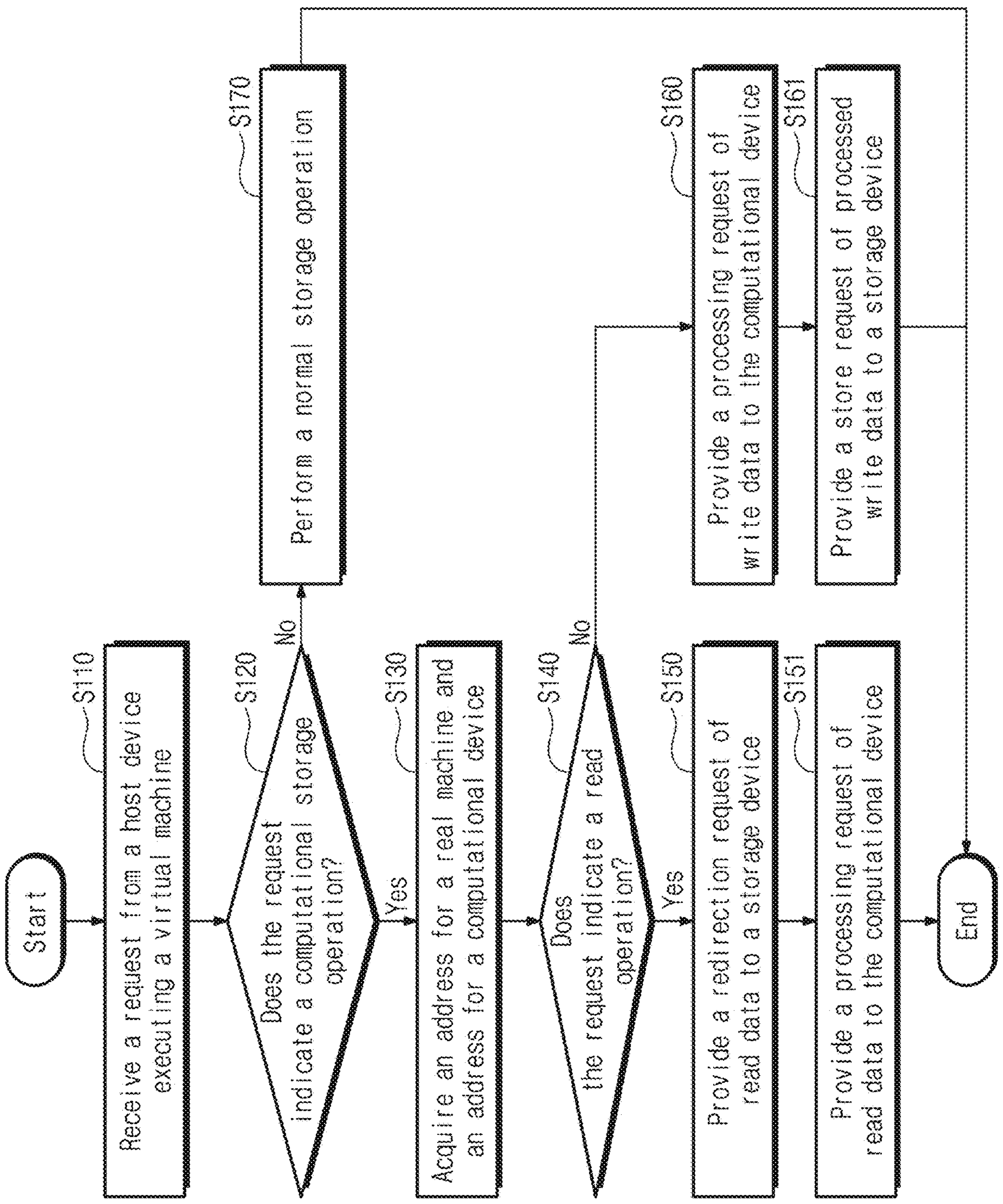
FIG. 6 is a flowchart illustrating a method of operating a virtualization device, according to some embodiments of the present disclosure.

FIG. 6 is a flowchart illustrating a method of operating a virtualization device, according to some embodiments of the present disclosure. Referring to FIGS. 2 and 6, a method of operating the virtualization device VD is described.

In operation S110, the virtualization device VD may receive a request from the host device 110 executing the virtual machine VM.

In operation S120, the virtualization device VD may determine whether the request of operation S110 indicates a computational storage operation. For example, the virtualization device VD may determine that the request indicates the computational storage operation when the reserved field of the request is present, and may determine that the request does not indicate the computational storage operation when the reserved field of the request is null. When it is determined that the request indicates the computational storage operation, the virtualization device VD may perform operation S130. When it is determined that the request does not indicate the computational storage operation, the virtualization device VD may perform operation S170.

In operation S130, the virtualization device VD may acquire an address of a real machine corresponding to the virtual machine VM and an address of the computational device 140. The real machine corresponding to the virtual machine VM may indicate the host device 110.

In some embodiments, in operation S130, the virtualization device VD may determine whether a direct parameter or file parameter of the reserved field of the request is present. When the direct parameter or file parameter is present, the virtualization device VD may read the direct parameter or file parameter.

In operation S140, the virtualization device VD may determine whether the request of operation S110 indicates a read operation. When it is determined that the request indicates the read operation, the virtualization device VD may perform operation S150. When it is determined that the request does not indicate the read operation, the virtualization device VD may perform operation S160.

In operation S150, the CSV device 120 of the virtualization device VD may provide a redirection request of read data to the storage device 130. In this case, the redirection request may indicate providing raw data stored in the storage device 130 to the computational device 140.

In operation S151, the CSV device 120 of the virtualization device VD may provide a processing request for read data to the computational device 140. In this case, the processing request of the read data may indicate that the computational device 140 processes the read data received from the storage device 130 and the computational device 140 provides processed read data to the host device 110.

Returning to operation S140, when it is determined in operation S140 that the request does not indicate the read operation, the virtualization device may perform operation S160.

In operation S160, the CSV device 120 of the virtualization device VD may provide a processing request of write data to the computational device 140. In this case, the processing request of the write data may indicate that the computational device 140 receives write data from the host device 110 and the computational device 140 processes the write data.

In operation S161, the CSV device 120 of the virtualization device VD may provide a store request of the processed write data to the storage device 130. In this case, the store request may indicate that the storage device 130 receives the processed write data from the computational device 140 and the storage device 130 stores the processed write data.

Returning to operation S120, when it is determined in operation S120 that the request does not indicate the computational storage operation, the virtualization device VD may perform operation S170.

In operation S170, the virtualization device VD may perform a normal storage operation. The normal storage operation may indicate a normal read operation or a normal write operation that does not involve processing operations such as compression, decompression, encryption, and decryption by an inner-computational device in the computational device 140 or the CSV device 120.

Figure 7:
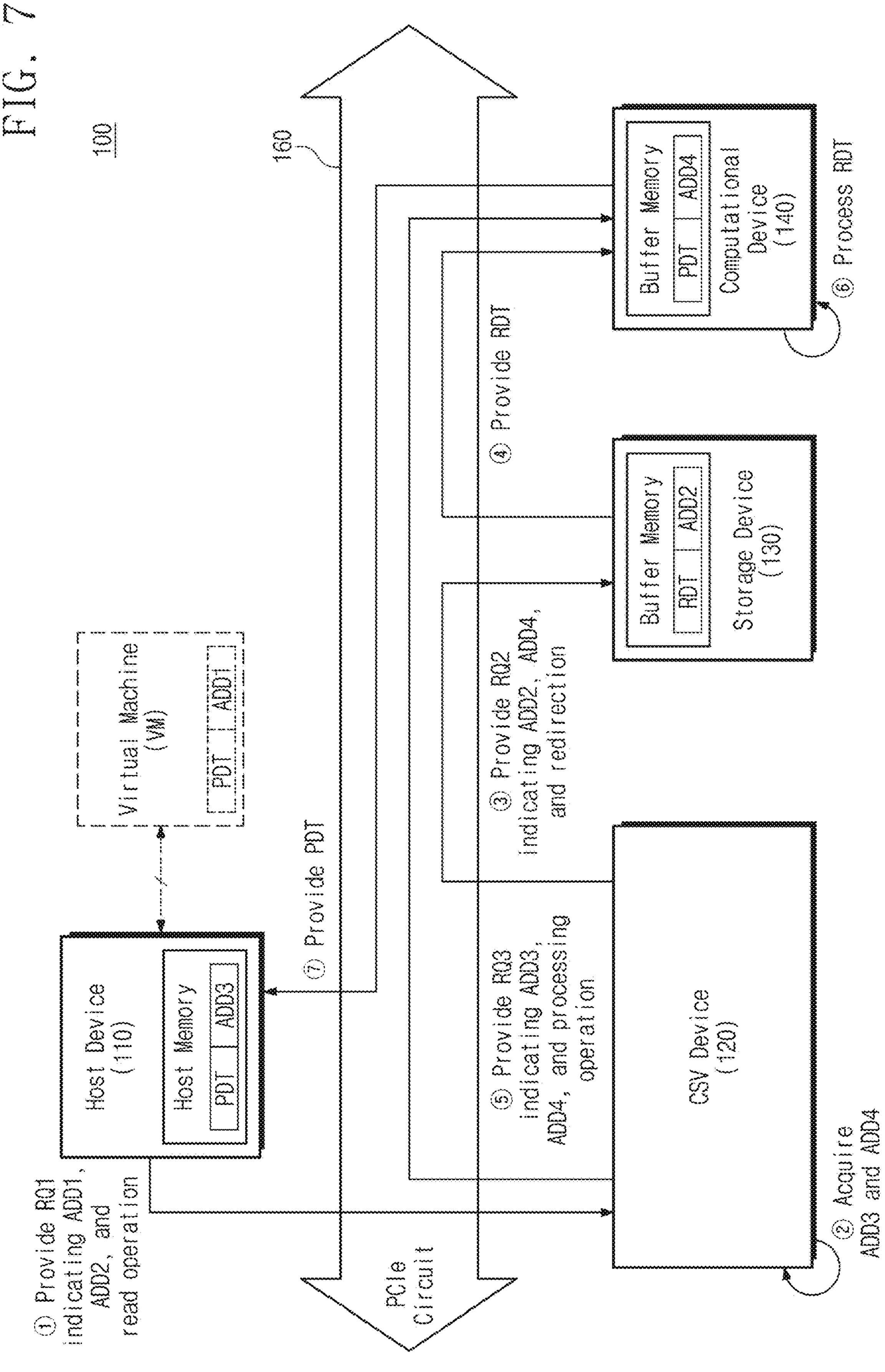
FIG. 7 is a diagram for describing a read operation of a storage system, according to some embodiments of the present disclosure.

FIG. 7 is a diagram for describing a read operation of a storage system, according to some embodiments of the present disclosure. Referring to FIGS. 1 and 7, the storage system 100 may include the host device 110, which executes the virtual machine VM, the CSV device 120, the storage device 130, the computational device 140, and the PCIe circuit 160.

According to some embodiments of the present disclosure, the storage system 100 may perform a read operation according to a request from the virtual machine VM. The read operation may include first to seventh operations ① to ⑦.

In the first operation ①, the host device 110 executing the virtual machine VM may provide the CSV device 120 with a first request RQ1 indicating a first address ADD1, a second address ADD2, and the read operation. The read operation may indicate reading raw data RDT stored in the storage device 130. The first address ADD1 may point to a virtual address of the virtual machine VM. The second address ADD2 may point to a location where the raw data RDT is stored in the storage device 130.

In the second operation ②, the CSV device 120 may acquire a third address ADD3 and a fourth address ADD4 based on the first request RQ1. The third address ADD3 may point to a location (i.e., a location in the host memory of the host device 110) of a real machine corresponding to the virtual machine VM. The fourth address ADD4 may point to a location in a buffer memory of the computational device 140 that will process the raw data RDT of the storage device 130.

In the third operation ③, the CSV device 120 may provide the storage device 130 with a second request RQ2 indicating the second address ADD2, the fourth address ADD4, and redirection. The redirection may indicate providing data stored in the storage device 130 to the computational device 140 through the PCIe circuit 160.

In the fourth operation ④, the storage device 130 may provide the raw data RDT to the computational device 140 based on the second request RQ2. For example, the storage device 130 may perform DMA communication with the computational device 140 through the PCIe circuit 160 based on the second address ADD2 and the fourth address ADD4 of the second request RQ2. The storage device 130 may inform the CSV device 120 that the second request RQ2 is processed, by providing the raw data RDT to the computational device 140 and then providing a completion to the CSV device 120.

In the fifth operation ⑤, the CSV device 120 may provide the computational device 140 with a third request RQ3 indicating the third address ADD3, the fourth address ADD4, and a processing operation. The processing operation may indicate that the computational device 140 processes (e.g., decompress, decrypt, or the like) the raw data RDT.

In the sixth operation ⑥, the computational device 140 may generate processed data PDT by processing the raw data RDT based on the third request RQ3. The processed data PDT may be decompressed data or decrypted data.

In the seventh operation ⑦, the computational device 140 may provide the processed data PDT to the host device 110 based on the third request RQ3. For example, the computational device 140 may perform DMA communication with the host device 110 through the PCIe circuit 160 based on the third address ADD3 and the fourth address ADD4 of the third request RQ3. The computational device 140 may provide the processed data PDT to the host device 110 and then may provide a done notification to the CSV device 120. The CSV device 120 may issue a completion for the virtual machine VM in response to the done notification.

Figure 8:
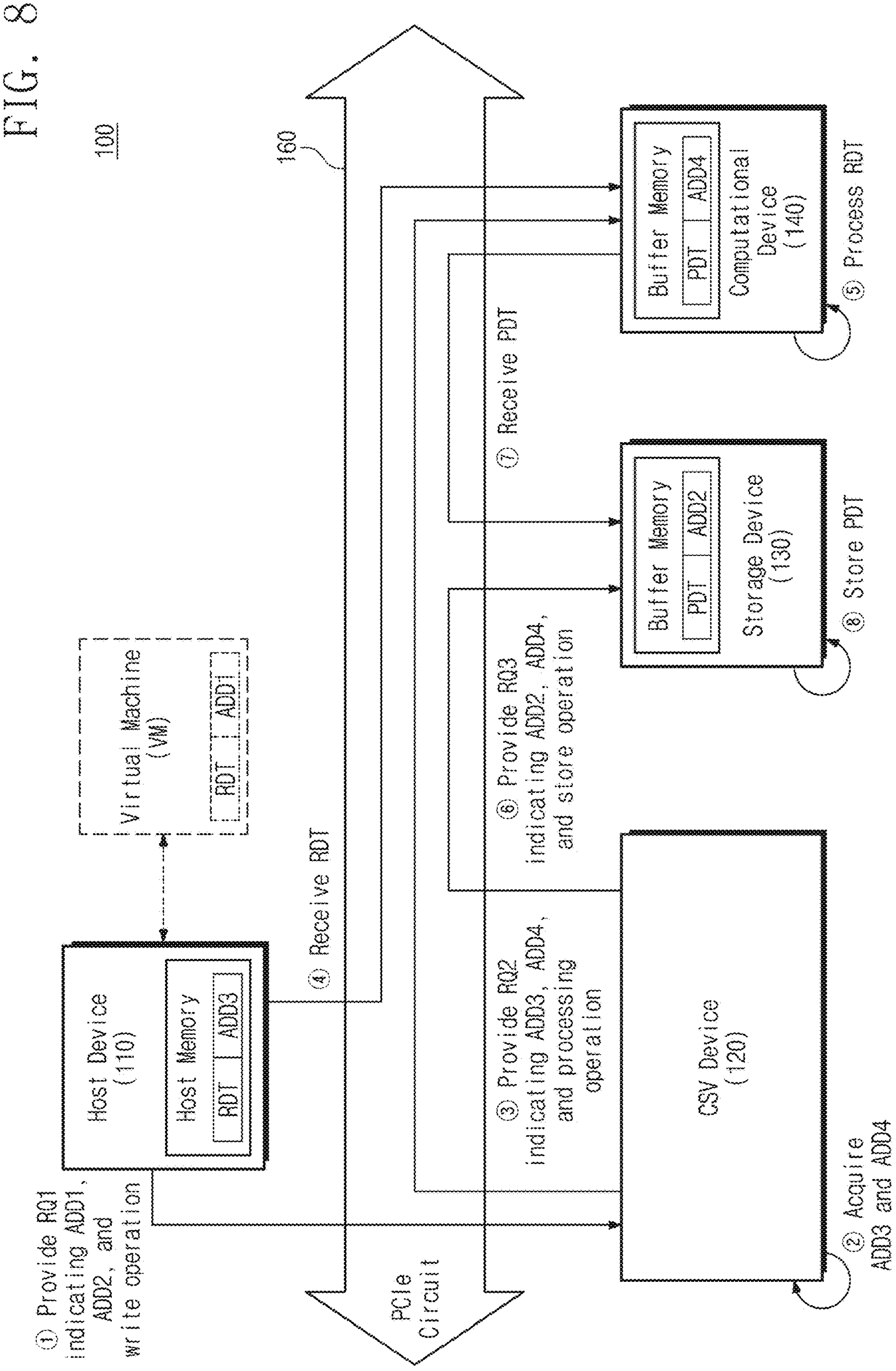
FIG. 8 is a diagram for describing a write operation of a storage system, according to some embodiments of the present disclosure.

FIG. 8 is a diagram for describing a write operation of a storage system, according to some embodiments of the present disclosure. Referring to FIGS. 1 and 8, the storage system 100 may include the host device 110, which executes the virtual machine VM, the CSV device 120, the storage device 130, the computational device 140, and the PCIe circuit 160.

According to some embodiments of the present disclosure, the storage system 100 may perform a write operation according to a request from the virtual machine VM. The write operation may include first to eighth operations ① to ⑧.

In the first operation ①, the host device 110 executing the virtual machine VM may provide the CSV device 120 with the first request RQ1 indicating the first address ADD1, the second address ADD2, and the write operation. The write operation may indicate writing the raw data RDT corresponding to a virtual address of the virtual machine VM to the storage device 130. The first address ADD1 may point to the virtual address of the virtual machine VM. The second address ADD2 may indicate a location where the processed data PDT corresponding to the raw data RDT is to be stored in the storage device 130.

In the second operation ②, the CSV device 120 may acquire the third address ADD3 and the fourth address ADD4 based on the first request RQ1. The third address ADD3 may point to a location (i.e., a location in the host memory of the host device 110) of a real machine corresponding to the virtual machine VM. The fourth address ADD4 may point to a location in a buffer memory of the computational device 140 that will process the raw data RDT of the virtual machine VM.

In the third operation ③, the CSV device 120 may provide the computational device 140 with the second request RQ2 indicating the third address ADD3, the fourth address ADD4, and a processing operation. The processing operation may indicate that the computational device 140 receives the raw data RDT from the host device 110 and the computational device 140 processes (e.g., compress, encrypt, or the like) the raw data RDT.

In the fourth operation ④, the computational device 140 may receive the raw data RDT from the host device 110 based on the second request RQ2. For example, the computational device 140 may perform DMA communication with the host device 110 through the PCIe circuit 160 based on the third address ADD3 and the fourth address ADD4 of the second request RQ2.

In the fifth operation ⑤, the computational device 140 may generate processed data PDT by processing the raw data RDT based on the second request RQ2. The processed data PDT may be compressed data or encrypted data. The computational device 140 may generate the processed data PDT and then may provide a done notification to the CSV device 120.

In the sixth operation ⑥, the CSV device 120 may provide the storage device 130 with the third request RQ3 indicating the second address ADD2, the fourth address ADD4, and a store operation. The store operation may indicate that the storage device 130 receives the processed data PDT from the computational device 140 and the storage device 130 stores the processed data PDT.

In the seventh operation ⑦, the storage device 130 may receive the processed data PDT from the computational device 140 based on the third request RQ3. For example, the storage device 130 may perform DMA communication with the computational device 140 through the PCIe circuit 160 based on the second address ADD2 and the fourth address ADD4 of the third request RQ3.

In the eighth operation ⑧, the storage device 130 may store the processed data PDT based on the third request RQ3. The storage device 130 may store the processed data PDT and then may provide a completion to the CSV device 120. The CSV device 120 may provide a completion to the virtual machine VM based on the completion received from the storage device 130.

Figure 9:
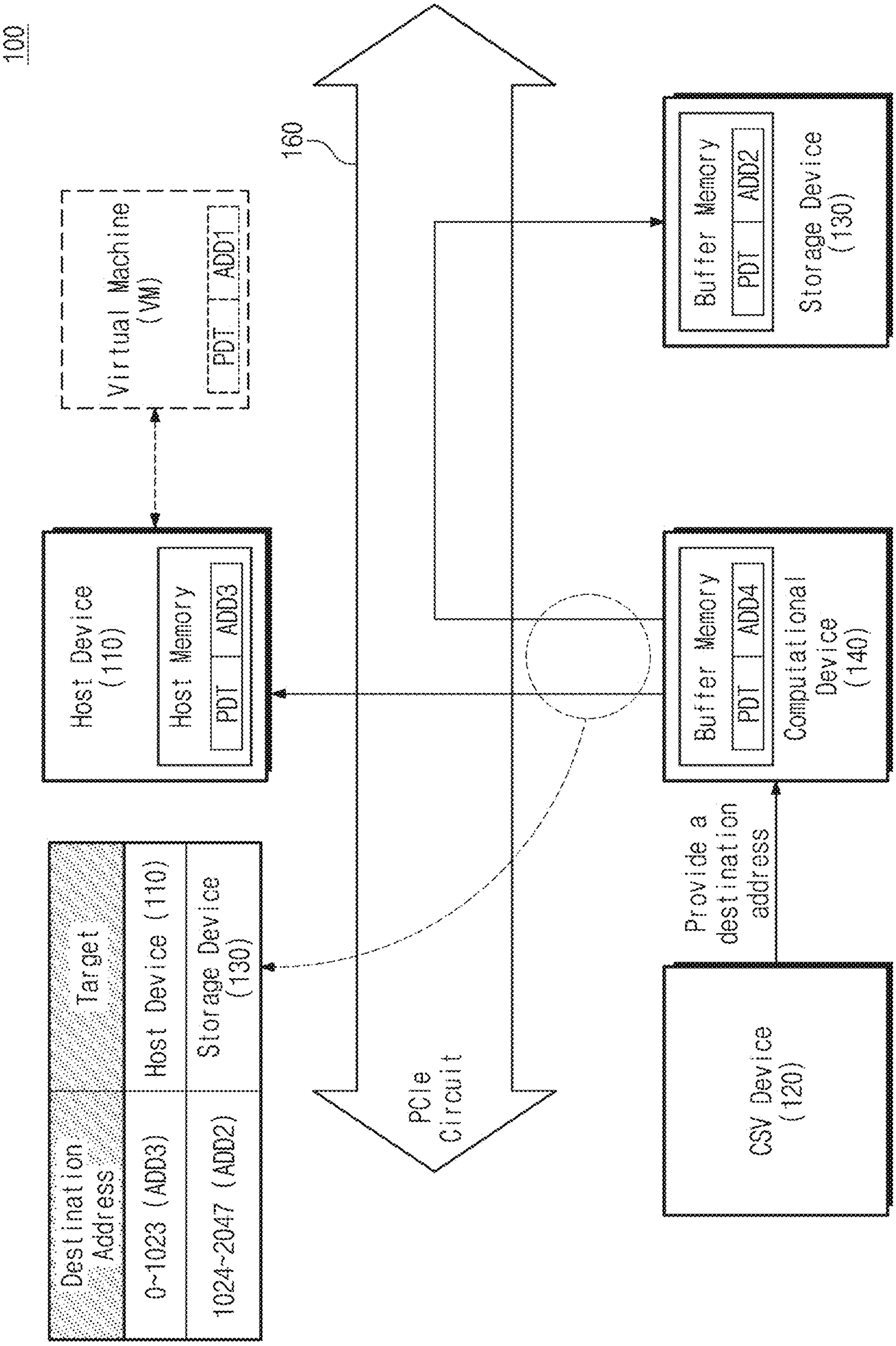
FIG. 9 is a diagram for describing direct communication between devices of a storage system, according to some embodiments of the present disclosure.

FIG. 9 is a diagram for describing direct communication between devices of a storage system, according to some embodiments of the present disclosure. Referring to FIG. 9, the storage system 100 may include the host device 110, the CSV device 120, the storage device 130, the computational device 140, and the PCIe circuit 160.

An arbitrary combination of the host device 110, the storage device 130, and the computational device 140 may directly communicate data (i.e., perform DMA communication) through PCIe communication. For better understanding of the present disclosure, FIG. 9 illustrates an operation in which the computational device 140 provides the processed data PDT to the host device 110 or the storage device 130 as a source. However, the host device 110 and the storage device 130 may also operate as a source similarly to that described later.

The CSV device 120 may provide a source address and a destination address to the computational device 140. The source address may be the fourth address ADD4 pointing to a location of the buffer memory of the computational device 140. The destination address may point to the host device 110 or the storage device 130, which is capable of communicating with the computational device 140 through the PCIe circuit 160.

For example, an address in a range between 0 and 1023 may be the third address ADD3 corresponding to the host device 110. When the CSV device 120 provides the computational device 140 with the address in the range between 0 and 1023 as the destination address, the computational device 140 may directly provide the processed data PDT to the host device 110 through the PCIe circuit 160 with reference to the destination address.

As another example, an address in a range between 1024 and 2047 may be the second address ADD2 corresponding to the storage device 130. When the CSV device 120 provides the computational device 140 with the address in the range between 1024 and 2047 as the destination address, the computational device 140 may directly provide the processed data PDT to the storage device 130 through the PCIe circuit 160 with reference to the destination address.

Figure 10:
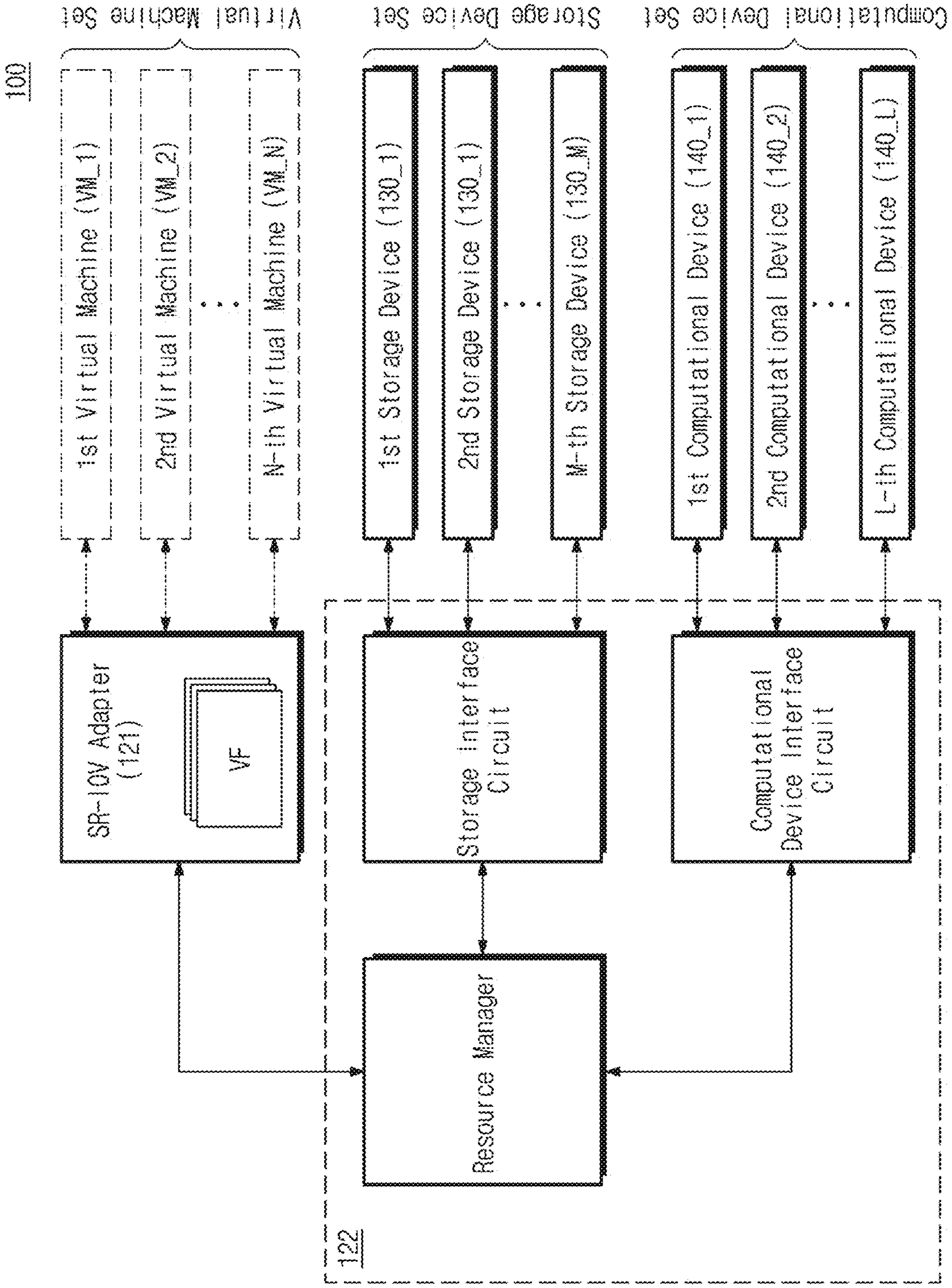
FIG. 10 is a block diagram for describing a storage system having flexible scalability, according to some embodiments of the present disclosure.

FIG. 10 is a block diagram for describing a storage system having flexible scalability, according to some embodiments of the present disclosure. Referring to FIG. 10, the storage system 100 may manage resource allocation between a plurality of virtual machines, a plurality of storage devices, and a plurality of computational devices.

The storage system 100 may include a virtual machine set, a storage device set, a computational device set, the SR-IOV adapter 121, and the device orchestrator 122.

The virtual machine set may include first to N-th virtual machines VM_1 to VM_N. The storage device set may include first to M-th storage devices 130_1 to 130_M. The computational device set may include first to L-th computational devices 140_1 to 140_L. Here, 'N', 'M', and are arbitrary natural numbers.

The SR-IOV adapter 121 may communicate with the virtual machine set. The SR-IOV adapter 121 may include a plurality of VFs. The plurality of VFs may provide an interface between the first to N-th virtual machines VM_1 to VM_N and a resource manager.

A storage interface circuit may communicate with the storage device set. The storage interface circuit may provide an interface between the first to M-th storage devices 130_1 to 130_M and the resource manager.

A computational device interface circuit may communicate with the computational device set. The computational device interface circuit may provide an interface between the first to L-th computational devices 140_1 to 140_L and the resource manager.

The resource manager may manage resource allocation among the virtual machine set, the storage device set, and the computational device set. For example, the resource manager may allocate the first storage device 130_1 and the first computational device 140_1 to the first virtual machine VM_1. Alternatively, the resource manager may allocate the first and second storage devices 130_1 and 130_2 and the first and second computational devices 140_1 and 140_2 to the first virtual machine VM_1.

When the number of virtual machines increases or decreases, when the number of storage devices increases or decreases, or when the number of computational devices increases or decreases, the resource manager may flexibly allocate storage resources and computational resources to a virtual machine depending on the changed virtualization environment.

When storage resources or computational resources are insufficient, the storage resources or computational resources may be flexibly expanded by adding another storage device or another computational device to the PCIe circuit 160 of FIG. 1.

Figure 11:
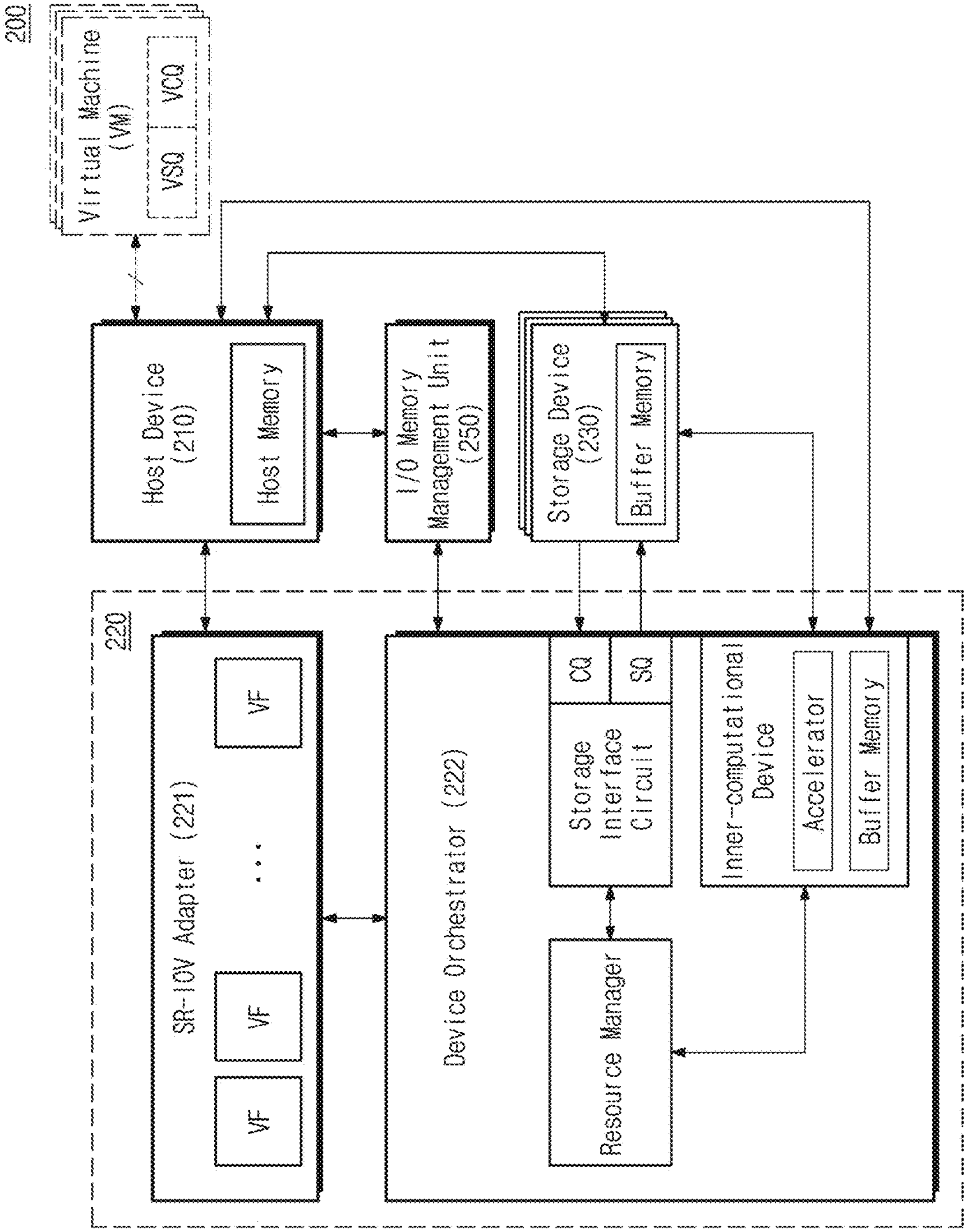
FIG. 11 is a block diagram for describing a storage system, according to some embodiments of the present disclosure.

FIG. 11 is a block diagram for describing a storage system, according to some embodiments of the present disclosure. A storage system 200 according to some embodiments of the present disclosure will be described with reference to FIG. 11.

The storage system 200 may manage a request from the virtual machine VM. The storage system 200 may include a host device 210, a CSV device 220, a storage device 230, and an I/O memory management unit 250. The CSV device 220 may include an SR-IOV adapter 221 and a device orchestrator 222.

Features of the virtual machine VM, the host device 210, SR-IOV adapter 221, the storage device 230, and the I/O memory management unit 250 are similar to features of the virtual machine VM, the host device 110, the SR-IOV adapter 121, the storage device 130, and the I/O memory management unit 150 in FIG. 3, and thus a detailed description thereof will be omitted to avoid redundancy.

The device orchestrator 222 may include a resource manager, a storage interface circuit, and an inner-computational device. The inner-computational device may include an accelerator and a buffer memory. The accelerator may provide computational resources. For example, the accelerator may perform operations such as compression, decompression, encryption, and decryption. The buffer memory of the inner-computational device may directly communicate with the buffer memory of the storage device 230 and the host memory of the host device 210 through the PCIe circuit. The resource manager may allocate storage resources of the storage device 230 and computational resources of the inner-computational device to the virtual machine VM. That is, the inner-computational device may perform a function similar to that of the computational device 140 of FIG. 3.

In some embodiments, the CSV device 220 may be implemented with a hardware accelerator. For example, the CSV device 220 may be implemented with an FPGA. The FPGA may be hardware that provides computational resources and manages storage resources and computational resources for the virtual machine VM.

Figure 12:
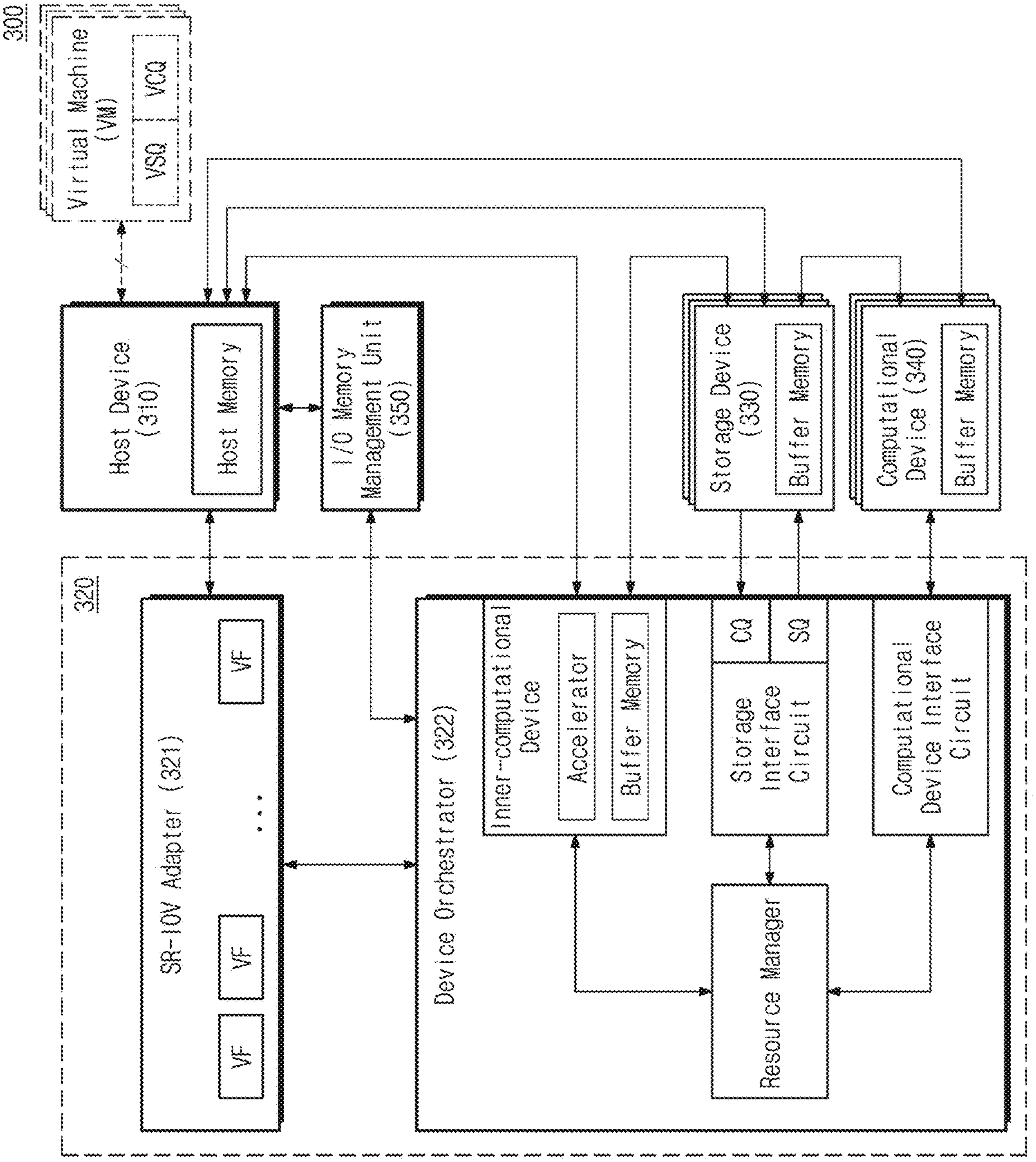
FIG. 12 is a block diagram for describing a storage system, according to some embodiments of the present disclosure.

FIG. 12 is a block diagram for describing a storage system, according to some embodiments of the present disclosure. A storage system 300 according to some embodiments of the present disclosure will be described with reference to FIG. 12. The storage system 300 may manage a request from the virtual machine VM. The storage system 300 may include a host device 310, a CSV device 320, a storage device 330, a computational device 340, and an I/O memory management unit 350. The CSV device 320 may include an SR-IOV adapter 321 and a device orchestrator 322.

Features of the virtual machine VM, the host device 310, SR-IOV adapter 321, the storage device 330, the computational device 340, and the I/O memory management unit 350 are similar to features of the virtual machine VM, the host device 110, the SR-IOV adapter 121, the storage device 130, the computational device 140, and the I/O memory management unit 150 in FIG. 3, and thus a detailed description thereof will be omitted to avoid redundancy.

The device orchestrator 322 may include a resource manager, an inner-computational device, a storage interface circuit, and a computational device interface circuit.

The inner-computational device may include an accelerator and a buffer memory. The accelerator may provide computational resources. The computational device 340 may provide a computational resource. The resource manager comprehensively manages the inner-computational device and the computational device 340, and may allocate computational resources to the virtual machine VM.

Figure 13:
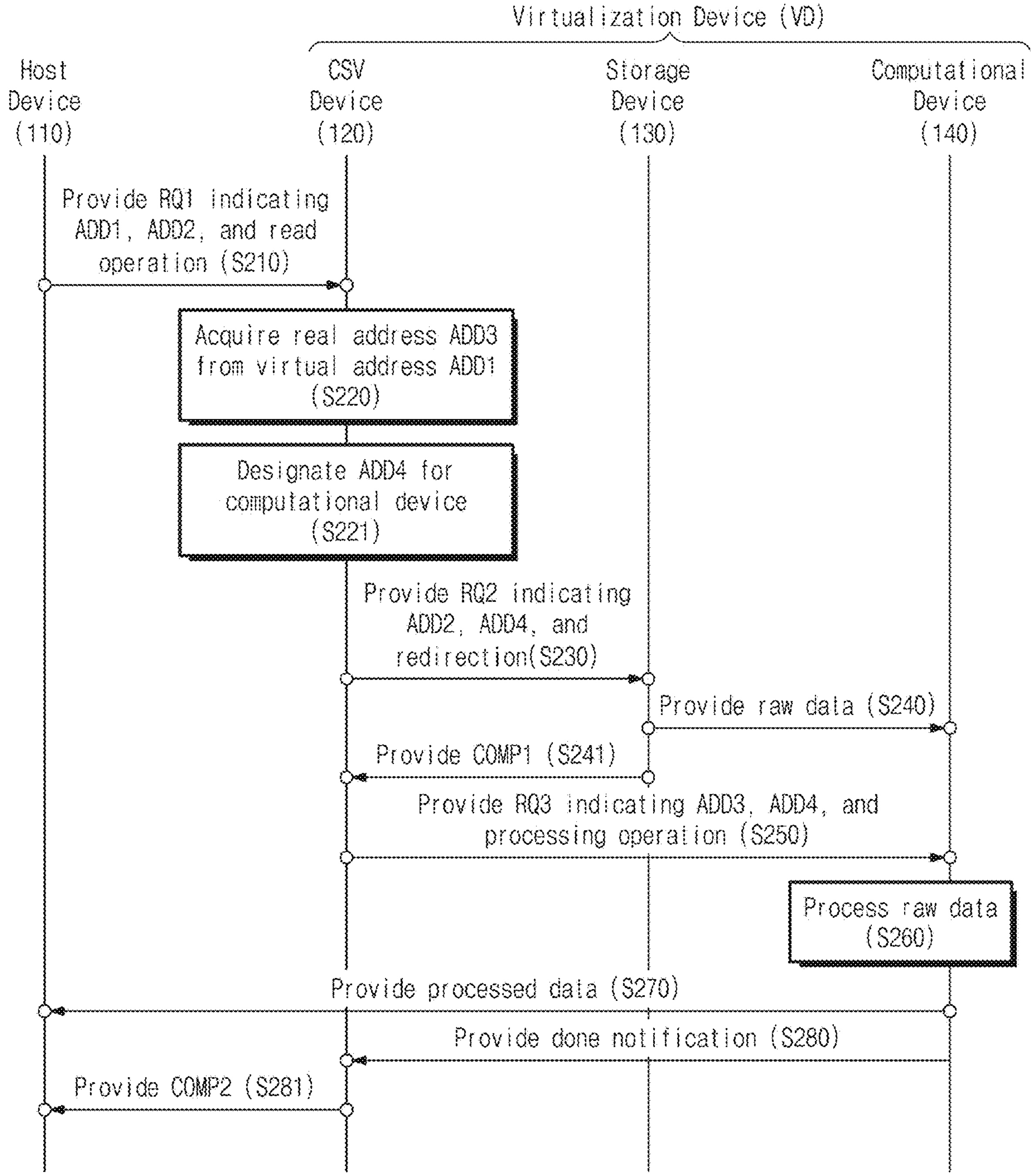
FIG. 13 is a flowchart for describing a read operation of a virtualization device, according to some embodiments of the present disclosure.

FIG. 13 is a flowchart for describing a read operation of a virtualization device, according to some embodiments of the present disclosure. A read operation of the virtualization device VD is described with reference to FIG. 13. The virtualization device VD may communicate with the host device 110 executing a virtual machine. The virtualization device VD may include the CSV device 120, the storage device 130, and the computational device 140.

In operation S210, the virtualization device VD may receive the first request RQ1 indicating the first address ADD1, the second address ADD2, and the read operation from the host device 110 through the CSV device 120. The first address ADD1 may point to a virtual address of the virtual machine executed by the host device 110. The second address ADD2 may point to a location in the storage device 130 where raw data corresponding to the read operation is stored.

In operation S220, the virtualization device VD may acquire the third address ADD3 from the first address ADD1 through the CSV device 120. The first address ADD1 may be a virtual address of the virtual machine. The third address ADD3 may be an address of a real machine (i.e., the host device 110) corresponding to the virtual machine. The CSV device 120 may acquire the third address ADD3 from the first address ADD1 with reference to an address translation table embedded therein. Alternatively, the virtualization device VD may further include an I/O memory management unit, and the CSV device 120 may receive the third address ADD3 corresponding to the first address ADD1 from the I/O memory management unit.

In operation S221, the virtualization device VD may designate the fourth address ADD4 pointing to a location of a buffer memory of the computational device 140 through the CSV device 120. For example, the CSV device 120 may identify the computational device 140 and may allocate computational resources of the computational device 140 to the virtual machine VM.

In operation S230, the virtualization device VD may provide the second request RQ2 indicating the second address ADD2, the fourth address ADD4, and redirection to the storage device 130 through the CSV device 120. The redirection may indicate that the storage device 130 provides raw data to the computational device 140.

In operation S240, the virtualization device VD may provide the raw data to the computational device 140 through the storage device 130, based on the second request RQ2. The raw data may be compressed data or encrypted data.

In operation S241, the virtualization device VD may process the raw data and then may provide a first completion COMP1 to the CSV device 120 through the storage device 130. The first completion may be written to CQ of the CSV device 120.

In operation S250, the virtualization device VD may provide the computational device 140 with the third request RQ3 indicating the third address ADD3, the fourth address ADD4, and a processing operation in response to the first completion COMP1 through the CSV device 120. The processing operation may indicate that the computational device 140 processes the raw data and the computational device 140 provides the processed data to the host device 110.

In operation S260, the virtualization device VD may process the raw data through the computational device 140. For example, the computational device 140 may generate the processed data by decompressing or decrypting the raw data. The processed data may be decompressed data or decrypted data.

In operation S270, the virtualization device VD may provide the host device 110 with the processed data through the computational device 140 based on the third request RQ3.

In operation S280, the virtualization device VD may provide a done notification to the CSV device 120 through the computational device 140.

In operation S281, the virtualization device VD may provide the host device 110 with a second completion COMP2 in response to the done notification through the CSV device 120. The second completion COMP2 may be written to VCQ of the virtual machine VM.

Figure 14:
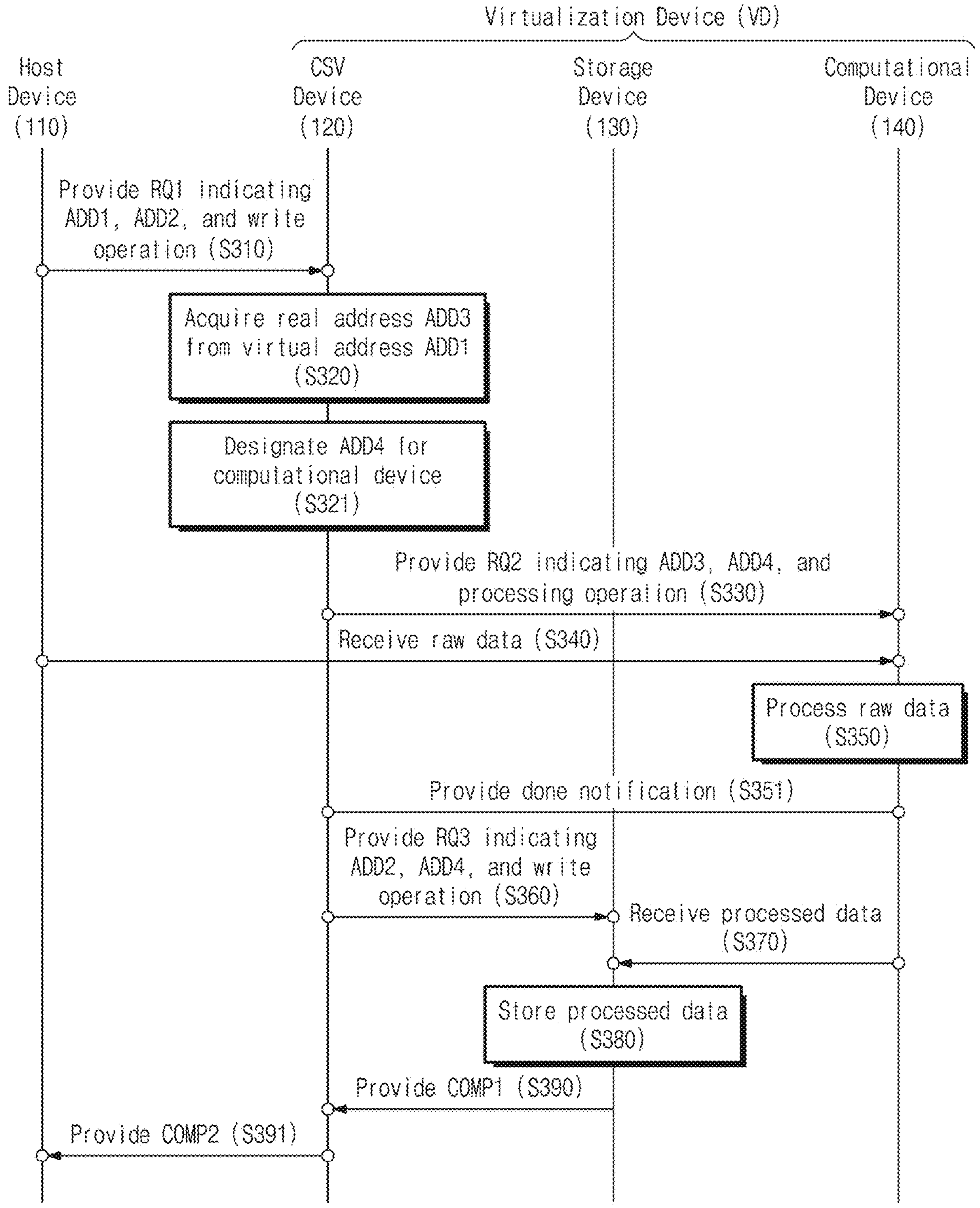
FIG. 14 is a flowchart for describing a write operation of a virtualization device, according to some embodiments of the present disclosure.

FIG. 14 is a flowchart for describing a write operation of a virtualization device, according to some embodiments of the present disclosure. A write operation of the virtualization device VD is described with reference to FIG. 14. The virtualization device VD may communicate with the host device 110 executing a virtual machine. The virtualization device VD may include the CSV device 120, the storage device 130, and the computational device 140.

In operation S310, the virtualization device VD may receive the first request RQ1 indicating the first address ADD1, the second address ADD2, and the write operation from the host device 110 through the CSV device 120. The first address ADD1 may point to a virtual address of the virtual machine executed by the host device 110. The second address ADD2 may point to a location in the storage device 130 where the processed data will be stored after the raw data corresponding to the write operation is processed.

In operation S320, the virtualization device VD may acquire the third address ADD3 from the first address ADD1 through the CSV device 120. The first address ADD1 may be a virtual address of the virtual machine. The third address ADD3 may be an address of a real machine (i.e., the host device 110) corresponding to the virtual machine. The CSV device 120 may acquire the third address ADD3 from the first address ADD1 with reference to an address translation table embedded therein. Alternatively, the virtualization device VD may further include an I/O memory management unit, and the CSV device 120 may receive the third address ADD3 corresponding to the first address ADD1 from the I/O memory management unit.

In operation S321, the virtualization device VD may designate the fourth address ADD4 pointing to a location of a buffer memory of the computational device 140 through the CSV device 120. For example, the CSV device 120 may identify the computational device 140 and may allocate computational resources of the computational device 140 to the virtual machine VM.

In operation S330, the virtualization device VD may provide the second request RQ2 indicating the third address ADD3, the fourth address ADD4, and a processing operation to the computational device 140 through the CSV device 120. The processing operation may indicate that the computational device 140 receives raw data from the host device 110 and the computational device 140 processes the raw data.

In operation S340, the virtualization device VD may receive the raw data from the host device 110 based on the second request RQ2 through the computational device 140. The raw data may be uncompressed data or unencrypted data.

In operation S350, the virtualization device VD may process the raw data through the computational device 140. For example, the computational device 140 may generate the processed data by compressing or encrypting the raw data. The processed data may be compressed data or encrypted data.

In operation S351, the virtualization device VD may provide a done notification to the CSV device 120 through the computational device 140.

In operation S360, the virtualization device VD may provide the storage device 130 with the third request RQ3 indicating the second address ADD2, the fourth address ADD4, and a store operation in response to a done notification through the CSV device 120.

In operation S370, the virtualization device VD may receive the processed data from the computational device 140 based on the third request RQ3 through the storage device 130.

In operation S380, the virtualization device VD may store the processed data through the storage device 130.

In operation S390, the virtualization device VD may store the processed data and then may provide the first completion COMP1 to the CSV device 120 through the storage device 130. The first completion may be written to CQ of the CSV device 120.

In operation S391, the virtualization device VD may provide the second completion COMP2 to the host device 110 in response to the first completion COMP1 through the CSV device 120. The second completion COMP2 may be written to VCQ of the virtual machine VM.

The above description refers to detailed embodiments for carrying out the invention. Embodiments in which a design is changed simply or which are easily changed may be included in the present disclosure as well as an embodiment described above. In addition, technologies that are easily changed and implemented by using the above embodiments may be included in the present disclosure. While the present disclosure has been described with reference to embodiments thereof, it will be apparent to those of ordinary skill in the art that various changes and modifications may be made thereto without departing from the spirit and scope of the present disclosure as set forth in the following claims.

According to an embodiment of the present disclosure, a virtualization device including a storage device and a computational device, and a method of operating the same are provided.

Furthermore, it is possible to provide a virtualization device that flexibly manages storage resources and computational resources while the resource burden of a host device is reduced by providing computational resources through a hardware accelerator and guaranteeing direct communication between different devices based on an address of a real machine corresponding to a virtual machine and an address of a computational device, and a method for operating the same.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. A method of operating a virtualization device communicating with a host device executing a virtual machine, the virtualization device including a computational storage virtualization (CSV) device, a storage device, and a computational device, wherein each of the CSV device and the computational device is implemented with a field programmable gate array (FPGA), the method comprising:

receiving, by the CSV device, a first request indicating a first address of the virtual machine, a second address of the storage device, and a read operation from the host device, the first request including a reserved field corresponding to a command format of a non-volatile memory express (NVMe) standard;

acquiring, by the CSV device, a third address of a host memory of the host device and a fourth address of a buffer memory of the computational device based on the first request;

providing, by the CSV device, the storage device with a second request indicating the second address, the fourth address, and a redirection;

providing, by the storage device, the computational device with raw data in response to the second request;

providing, by the CSV device, the computational device with a third request indicating the third address, the fourth address, and a processing operation;

generating, by the computational device, processed data based on the third request and the raw data; and providing, by the computational device, the host device with the processed data, wherein the acquiring of the third address and the fourth address includes:

determining, by the CSV device, whether the first request indicates a computational storage operation by examining the reserved field included in the first request to check whether the reserved field is null or contains computational storage information; and acquiring, by the CSV device, the third address and the fourth address when the reserved field of the first request is determined to contain the computational storage information such that the first request indicates the computational storage operation.

2. The method of claim 1, wherein the virtualization device further includes:

a peripheral component interconnect express (PCIe) circuit connected to the host device, the CSV device, the storage device, and the computational device, wherein the providing, by the storage device, of the computational device with the raw data based on the second request includes:

directly providing, by the storage device, the computational device with the raw data based on the fourth address of the second request through the PCIe circuit, and wherein the providing, by the computational device, of the host device with the processed data includes:

directly providing, by the computational device, the host device with the processed data based on the third address of the third request through the PCIe circuit.

3. The method of claim 1, wherein the reserved field indicates at least one of:

an operator chain identifier indicating a type of the processing operation of the computational device;

a source address indicating a location of a source requesting the processed data;

a destination address indicating a location of a destination receiving the processed data;

a source size indicating a size of data to be transmitted depending on the source address;

a destination size indicating a size of data to be transmitted depending on the destination address;

a request identifier for managing dependency between different requests indicating operations having the same types as each other;

a physical device identifier indicating an index of the storage device and an index of the computational device;

a type indicating whether access to the storage device is required;

a direct parameter indicating a location in the host device at which information used for the processing operation of the computational device is stored;

a file parameter indicating a location in the storage device at which copied information used for the processing operation of the computational device is stored;

a direct parameter pointer used to transmit the direct parameter; and a file parameter pointer used to transmit the file parameter.

4. The method of claim 1, wherein the raw data in the storage device is compressed data or encrypted data, and wherein the processed data by the computational device is decompressed data or decrypted data.

5. The method of claim 1, wherein the providing, by the storage device, of the computational device with the raw data based on the second request includes:

after providing the raw data, providing, by the storage device, the CSV device with a first completion, wherein the providing, by the CSV device, of the computational device with the third request indicating the third address, the fourth address, and the processing operation includes:

providing, by the CSV device, the computational device with the third request in response to the first completion, and wherein the providing, by the computational device, of the host device with the processed data includes:

after providing the processed data, providing, by the computational device, the CSV device with a done notification; and providing, by the CSV device, the host device with a second completion in response to the done notification.

6. The method of claim 1, wherein the acquiring, by the CSV device, of the third address of the real machine corresponding to the virtual machine and the fourth address of the computational device based on the first request includes:

acquiring, by the CSV device, the third address based on the first address with reference to an address translation table in the CSV device.

7. The method of claim 1, wherein the virtualization device further includes:

an input/output (I/O) memory management unit configured to communicate with the host device and the CSV device, and wherein the acquiring, by the CSV device, of the third address of the real machine corresponding to the virtual machine and the fourth address of the computational device based on the first request includes:

translating, by the I/O memory management unit, the first address into the third address based on the first request; and receiving, by the CSV device, the third address from the I/O memory management unit.

8. The method of claim 1, wherein the virtualization device identifies the virtual machine, which is a target virtual machine, from among a plurality of virtual machines, identifies the storage device, which is a target storage device, from among a plurality of storage devices, and identifies the computational device, which is a target computational device, from among a plurality of computational devices.

9. The method of claim 1, wherein the computational device is implemented with an inner-computational device of the CSV device.

10. A method of operating a virtualization device communicating with a host device executing a virtual machine and including a computational storage virtualization (CSV) device, a storage device, and a computational device, wherein each of the CSV device and the computational device is implemented with a field programmable gate array (FPGA), the method comprising:

communicating with a host device executing a virtual machine and including a CSV device and a computational device, each implemented with a field programmable gate array (FPGA), and a storage device, and, the method comprising:

receiving, by the CSV device, a first request indicating a first address of the virtual machine, a second address of the storage device, and a write operation from the host device, the first request including a reserved field corresponding to a command format of a non-volatile memory express (NVMe) standard;

acquiring, by the CSV device, a third address of host memory of the host device and a fourth address of a buffer memory of the computational device based on the first request;

providing, by the CSV device, the computational device with a second request indicating the third address, the fourth address, and a processing operation;

receiving, by the computational device, raw data in response to the second request from the host device;

generating, by the computational device, processed data based on the second request and the raw data;

providing, by the CSV device, the storage device with a third request indicating the second address, the fourth address, and a store operation;

receiving, by the storage device, the processed data based on the third request from the computational device; and storing, by the storage device, the processed data, wherein the acquiring the third address and the fourth address includes:

determining, by the CSV device, whether the first request indicates a computational storage operation by examining the reserved field included in the first request to check whether the reserved field is null or contains computational storage information; and acquiring, by the CSV device, the third address and the fourth address when the reserved field of the first request is determined to contain the computational storage information such that the first request indicates the computational storage operation.

11. The method of claim 10, wherein the virtualization device further includes:

a PCIe circuit connected to the host device, the CSV device, the storage device, and the computational device, wherein the receiving, by the computational device, of the raw data based on the second request from the host device includes:

directly receiving, by the computational device, the raw data based on the third address of the second request from the host device through the PCIe circuit, and wherein the receiving, by the storage device, of the processed data based on the third request from the computational device includes:

directly receiving, by the storage device, the processed data based on the fourth address of the third request from the computational device through the PCIe circuit.

12. The method of claim 10, wherein the reserved field indicates at least one of:

an operator chain identifier indicating a type of the processing operation of the computational device;

a source address indicating a location of a source requesting the processed data;

a destination address indicating a location of a destination receiving the processed data;

a source size indicating a size of data to be transmitted depending on the source address;

a destination size indicating a size of data to be transmitted depending on the destination address;

a request identifier for managing dependency between different requests indicating operations having the same types as each other;

a physical device identifier indicating an index of the CSV device, an index of the storage device and an index of the computational device;

a type indicating whether access to the storage device is required;

a direct parameter indicating a location in the host device at which information used for the processing operation of the computational device is stored;

a file parameter indicating a location in the storage device at which copied information used for the processing operation of the computational device is stored;

a direct parameter pointer used to transmit the direct parameter; and a file parameter pointer used to transmit the file parameter.

13. The method of claim 10, wherein the raw data of the host device is uncompressed data or unencrypted data, and wherein the processed data by the computational device is compressed data or encrypted data.

14. The method of claim 10, wherein the generating, by the computational device, of the processed data based on the second request and the raw data includes:

after generating the processed data, providing, by the computational device, the CSV device with a done notification, wherein the providing, by the CSV device, of the storage device with the third request indicating the second address, the fourth address, and the store operation includes:

providing, by the CSV device, the storage device with the third request in response to the done notification, and wherein the storing, by the storage device, of the processed data includes:

after storing the processed data, providing, by the storage device, the CSV device with a first completion; and providing, by the CSV device, the host device with a second completion in response to the first completion.

15. A virtualization device comprising:

a storage device configured to store first data;

a computational device configured to process the first data and to process second data of a virtual machine executed by a host device, and implemented with a field programmable gate array (FPGA);

a CSV device implemented with a FPGA; and a PCIe circuit connected to the storage device, the computational device, the CSV device, and the host device, wherein the CSV device is configured to:

receive a first request including a first address of the virtual machine and a second address of the storage device from the host device, the first request including a reserved field corresponding to a command format of a non-volatile memory express (NVMe) standard;

acquire a third address of a host memory of the host device and a fourth address of a buffer memory of the computational device;

determine whether the first request indicates a read operation or a write operation, by examining the reserved field included in the first request to check whether the reserved field is null or contains computational storage information, the read operation and the write operation being types of computational storage operations;

in response to determining that the reserved field contains the computational storage information such that the first request indicates the read operation, provide the storage device with a second request indicating the second address, the fourth address, and a redirection and provide the computational device with a third request indicating the third address, the fourth address, and a first processing operation of the first data; and in response to determining that the reserved field contains the computational storage information such that the first request indicates the write operation, provide the computational device with a fourth request indicating the third address, the fourth address, and a second processing operation of the second data and provide the storage device with a fifth request indicating the second address, the fourth address, and a store operation.

16. The virtualization device of claim 15, wherein the CSV device includes:

a single root input/output virtualization (SR-IOV) adapter including a virtual function (VF) providing an interface with the virtual machine; and a device orchestrator configured to:

identify the virtual machine through the VF;

allocate a resource of the storage device and a resource of the computational device for the virtual machine;

acquire the third address and the fourth address based on the first request; and generate the second request and the third request based on the first request or generate the fourth request and the fifth request based on the first request.

* * * * *